US010712908B2

(12) United States Patent
Kovacs et al.

(10) Patent No.: US 10,712,908 B2
(45) Date of Patent: Jul. 14, 2020

(54) CAREER HISTORY EXERCISE DATA VISUALIZATION

(71) Applicant: SAP SE, Walldorf (DE)

(72) Inventors: Zsuzsanna Kovacs, Sandhausen (DE); Christoph Dobiasz, Schwetzingen (DE); Simone Charlotte Holz, Sinsheim (DE); Nenad Dordevic, Sandhausen (DE); Aniko Zsofia Georgiev, Budapest (HU); Katalin Ocsai, Budapest (HU); Tamas Kirmer, Budapest (HU)

(73) Assignee: SAP SE, Walldorf (DE)

(*) Notice: Subject to any disclaimer, the term of this patent is extended or adjusted under 35 U.S.C. 154(b) by 763 days.

(21) Appl. No.: 15/204,756

(22) Filed: Jul. 7, 2016

(65) Prior Publication Data

US 2016/0320931 A1    Nov. 3, 2016

Related U.S. Application Data

(63) Continuation of application No. 13/717,608, filed on Dec. 17, 2012, now Pat. No. 9,430,133.

(51) Int. Cl.
*G06F 3/0482* (2013.01)
*G06Q 10/10* (2012.01)
*G06F 3/0484* (2013.01)
*G06F 3/0488* (2013.01)

(52) U.S. Cl.
CPC ........ *G06F 3/0482* (2013.01); *G06F 3/04845* (2013.01); *G06F 3/04847* (2013.01); *G06F 3/04883* (2013.01); *G06F 3/04886* (2013.01); *G06Q 10/10* (2013.01)

(58) Field of Classification Search
CPC ..... G06Q 10/10; G06F 3/0481; G06F 3/0482; G06F 3/04845; G06F 3/04847; G06F 3/04883; G06F 3/04886
USPC ....................................................... 434/219
See application file for complete search history.

(56) References Cited

U.S. PATENT DOCUMENTS

| | | |
|---|---|---|
| 6,240,421 B1 * | 5/2001 | Stolarz .............. G06F 3/0481 |
| 6,289,368 B1 | 9/2001 | Dentler et al. |
| 6,961,912 B2 | 11/2005 | Aoki et al. |
| 7,380,258 B2 | 5/2008 | Durden et al. |
| 7,464,109 B2 | 12/2008 | Modi |
| 7,493,592 B2 | 2/2009 | Karatal et al. |

(Continued)

OTHER PUBLICATIONS

Anne Weisberg and Cathy Benko, "Mass Career Customization™: A New Model for How Careers are Built," http://iveybusinessjournal.com/topics/leadership/mass-career-customization%E2%84%A2-a-new-model-for-how-careers-are-built (May/Jun. 2008) (6 pages).

(Continued)

*Primary Examiner* — Thomas J Hong
(74) *Attorney, Agent, or Firm* — Klarquist Sparkman, LLP

(57) ABSTRACT

Techniques and tools are described for facilitating user reflection on past decisions in order to determine trends and to assist in future decision-making. Technologies for administering a career history exercise and for visualizing results of the career history exercise are described. Visualizations include using stage cards representative of stages in a user's career history. User ratings of the stages in his or her career history are displayed on the stage cards using color-shaded ratings units.

19 Claims, 12 Drawing Sheets

(56) References Cited

U.S. PATENT DOCUMENTS

| | | | | |
|---|---|---|---|---|
| 7,912,790 | B2* | 3/2011 | Albertsson | G06Q 10/105 |
| | | | | 705/320 |
| 8,166,394 | B1* | 4/2012 | Melnicki | G06F 3/0482 |
| | | | | 715/200 |
| 8,311,866 | B1* | 11/2012 | Benko | G06Q 10/105 |
| | | | | 705/7.12 |
| 8,337,209 | B2 | 12/2012 | Ashman, Jr. | |
| 9,430,133 | B2 | 8/2016 | Kovacs et al. | |
| 2003/0050939 | A1 | 3/2003 | Dietz et al. | |
| 2003/0177027 | A1 | 9/2003 | DiMarco | |
| 2003/0180698 | A1* | 9/2003 | Salerian | G09B 5/00 |
| | | | | 434/238 |
| 2004/0063082 | A1 | 4/2004 | O'Donnell | |
| 2005/0170321 | A1* | 8/2005 | Scully | G06Q 10/10 |
| | | | | 434/219 |
| 2005/0288995 | A1 | 12/2005 | Kennedy et al. | |
| 2006/0061586 | A1* | 3/2006 | Brulle-Drews | A61B 3/066 |
| | | | | 345/594 |
| 2009/0055404 | A1 | 2/2009 | Heiden et al. | |
| 2009/0288018 | A1 | 11/2009 | Paliwal et al. | |
| 2009/0311654 | A1* | 12/2009 | Lopez | G09B 7/02 |
| | | | | 434/238 |
| 2010/0037170 | A1* | 2/2010 | Poole | G06F 3/0481 |
| | | | | 715/772 |
| 2010/0179916 | A1* | 7/2010 | Johns | G06Q 30/02 |
| | | | | 705/319 |
| 2010/0186066 | A1 | 7/2010 | Pollard | |
| 2010/0217121 | A1 | 8/2010 | Nemoto | |
| 2011/0219324 | A1* | 9/2011 | Watanabe | G06F 3/048 |
| | | | | 715/771 |
| 2011/0239129 | A1* | 9/2011 | Kummerfeld | G06F 3/0488 |
| | | | | 715/750 |
| 2012/0240064 | A1* | 9/2012 | Ramsay | G06T 11/00 |
| | | | | 715/762 |
| 2013/0151431 | A1 | 6/2013 | Linton et al. | |
| 2013/0262574 | A1 | 10/2013 | Cohen | |
| 2013/0317997 | A1* | 11/2013 | Sjoblom | G06Q 10/1053 |
| | | | | 705/321 |
| 2014/0026062 | A1 | 1/2014 | Proudfoot et al. | |
| 2014/0089219 | A1* | 3/2014 | Mathews | G06Q 50/2053 |
| | | | | 705/327 |
| 2014/0170616 | A1 | 6/2014 | Kovacs et al. | |
| 2014/0173489 | A1 | 6/2014 | Kovacs et al. | |
| 2014/0248598 | A1* | 9/2014 | Acuff | G09B 7/00 |
| | | | | 434/353 |
| 2015/0040018 | A1* | 2/2015 | Wu | G06Q 30/0631 |
| | | | | 715/738 |
| 2015/0089424 | A1* | 3/2015 | Duffield | G06Q 10/00 |
| | | | | 715/771 |
| 2015/0363481 | A1* | 12/2015 | Haynes | G06Q 10/10 |
| | | | | 707/748 |

OTHER PUBLICATIONS

Mass Career Customization (MCC), Interactive Exercise, "What's your sine?" http://www.masscareercustomization.com/interactive.html (accessed on Jul. 10, 2012) (10 pages).

PDI Ninth House, "The Profilor®," http://pdinh.com/sites/default/files/u20/Profilor_5.11.pdf (2011) (2 pages). www.vaadin.com, the star ratings image dated Dec. 2009.

Non-Final Office Action, U.S. Appl. No. 13/717,608, 30 pages, dated Oct. 16, 2014.

Final Office Action, U.S. Appl. No. 13/717,608, 36 pages, dated Apr. 27, 2015.

Advisory Action, U.S. Appl. No. 13/717,608, 6 pages, dated Jul. 16, 2015.

Non-Final Office Action, U.S. Appl. No. 13/717,608, 43 pages, dated Dec. 3, 2015.

Notice of Allowance, U.S. Appl. No. 13/717,608, 6 pages, dated Apr. 22, 2016.

Non-Final Office Action, U.S. Appl. No. 13/717,605, 16 pages, dated Jun. 10, 2014.

Non-Final Office Action, U.S. Appl. No. 13/717,605, 16 pages, dated Dec. 31, 2014.

Final Office Action, U.S. Appl. No. 13/717,605, 21 pages, dated Aug. 13, 2015.

Notice of Abandonment, U.S. Appl. No. 13/717,605, 2 pages, dated Apr. 22, 2016.

Cathy Benko and Anne Weisberg, "Mass Career Customization," http://www.tqsource.org/webcasts/201106Workshop/Resources/US_DeloitteReview MassCareerCustomization.pdf, Aug. 1, 2008, 13 pages.

Deloitte, "Introduction to Mass Career Customization: Aligning the Workplace with Today's Workforce," http://masscareercustomization.com/about.mcc.html, at least as early as Dec. 31, 2011, 14 pages.

Pontelin et al., "RatingStars component," https://vaadin.com/forum/#!/thread/72816/72815, May 29, 2009, 9 pages.

* cited by examiner

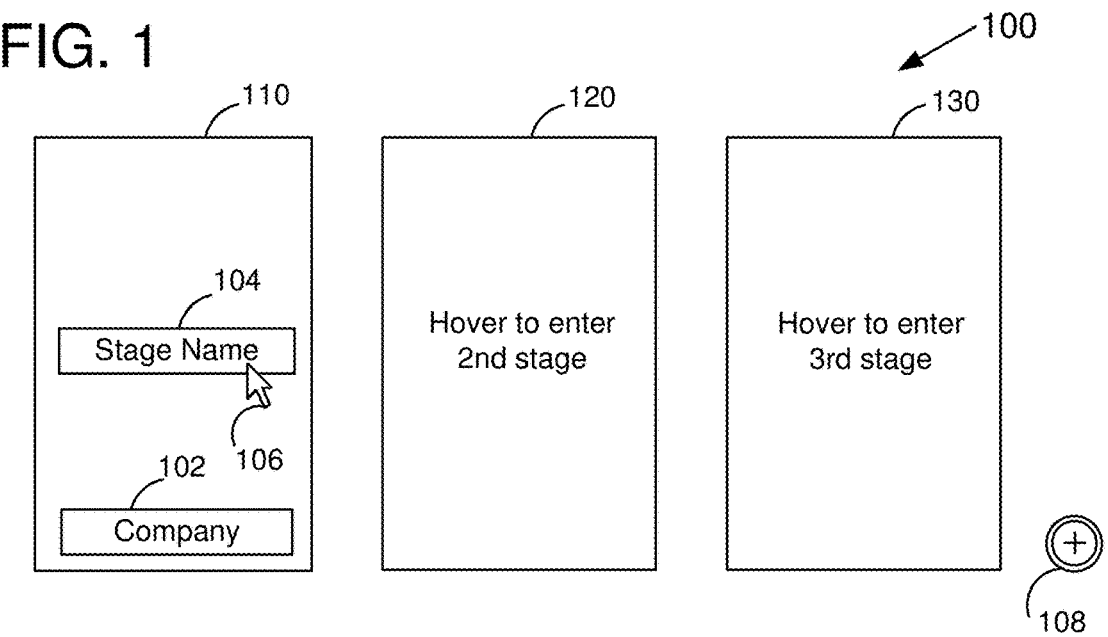
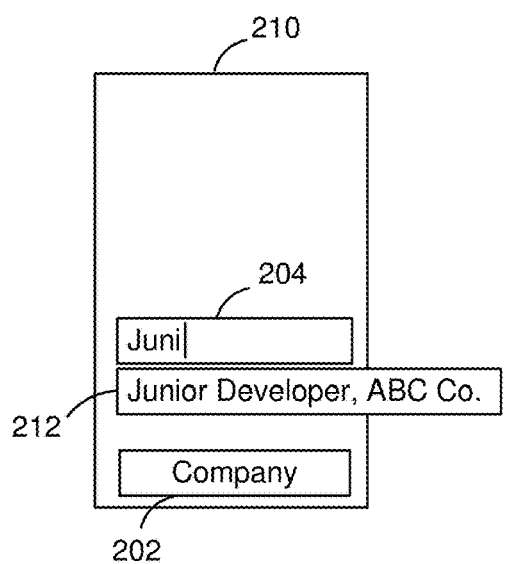
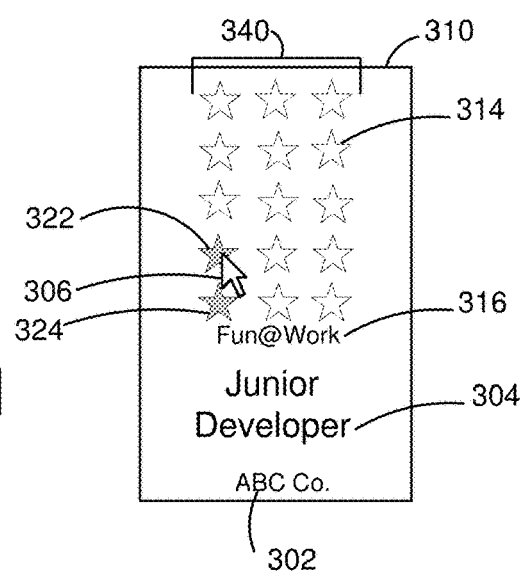
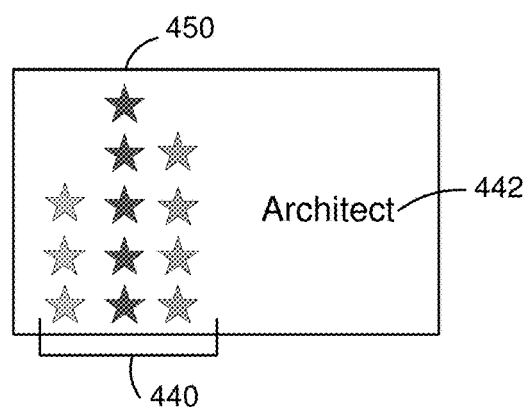

CAREER HISTORY EXERCISE DATA VISUALIZATION

CROSS REFERENCE TO RELATED APPLICATIONS

This is a continuation of and claims the benefit of U.S. patent application Ser. No. 13/717,608, filed Dec. 17, 2012, and titled "CAREER HISTORY EXERCISE WITH STAGE CARD VISUALIZATION," which application is hereby incorporated by reference in its entirety.

BACKGROUND

Individuals are constantly facing decisions that affect daily life. Often, such decisions relate to recurring questions about "What to do next?" or "What should I choose now?" For example, over the course of an individual's life, decisions are made that direct one's career, and it is common to question: "What should I do next in my career?" It is natural to look for external guidance in answering this and other questions related to career decisions.

Although a career coach, mentor, manager etc. can sometimes provide useful guidance and support to individuals making career decisions, such guidance can frequently be expensive, inefficient or unavailable. In addition, books, movies, lectures etc. can also be used to obtain advice for making career decisions. However, these techniques are often ineffective because they are unexciting, time-consuming, and/or not tailored to the individual.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for facilitating user reflection on past decisions in order to determine trends and to assist in future decision-making. For example, technologies described herein are directed toward aiding a user in looking back and reflecting on past career decisions in order to gain greater understanding of the motivations for these past decisions. Such reflection can provide insights into options for the future. For example, by facilitating user reflection, approaches that have been successful in the past can be distinguished, and a user can choose to apply such approaches again in the future.

As described herein, a variety of other features and advantages can be incorporated into the technologies as desired.

BRIEF DESCRIPTION OF THE DRAWINGS

FIG. 1 is an illustration of an exemplary user interface for administering a career history exercise using stage cards.

FIG. 2 is an illustration of an exemplary stage card integrated with pre-existing career history data.

FIG. 3 is an illustration of an exemplary stage card with ratings units and various descriptive text.

FIG. 4 is an illustration of an exemplary stage card with ratings units color-shaded according to user rating of that stage.

DETAILED DESCRIPTION

Example 1—Exemplary Overview

Figure 5:
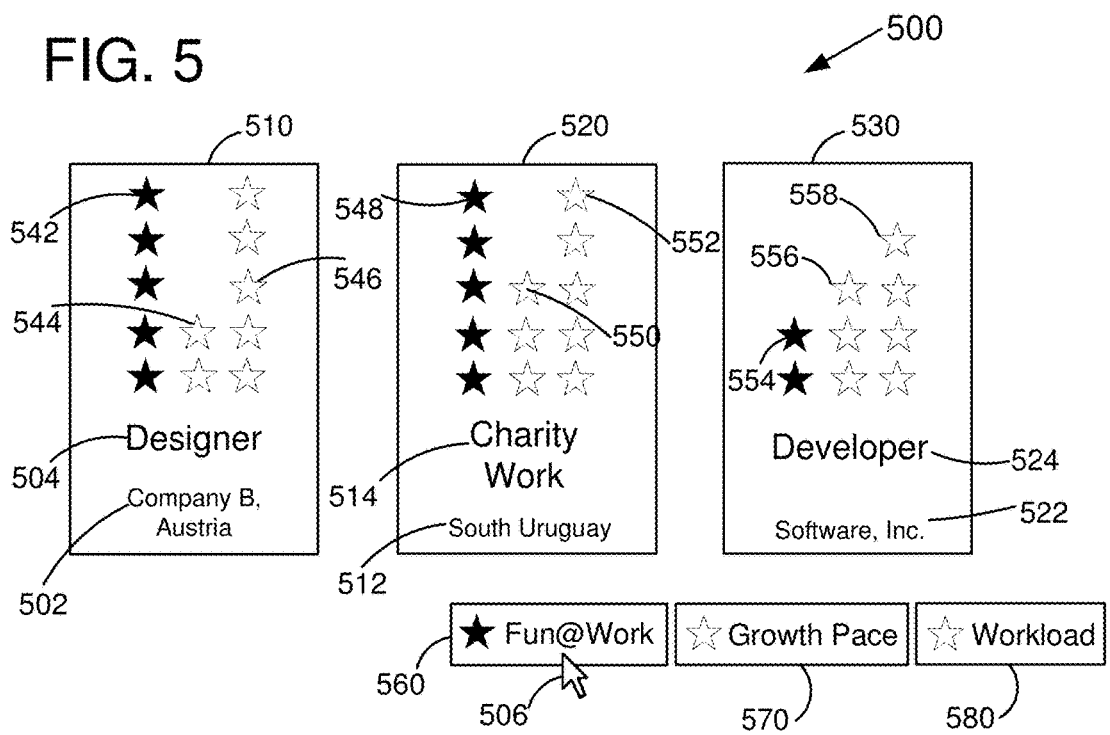
FIG. 5 is an illustration of exemplary results of a career history exercise performed using stage cards with user interface elements for selective viewing of ratings categories.

The technologies described herein can be used for a variety of career history or decision history exercises. Adoption of the technologies can facilitate user reflection on past decisions and user assessment of decision-making trends or patterns. For example, technologies can aid a user in looking back and reflecting on past career decisions in order to gain greater understanding of the motivations for these past decisions. Technologies can provide insights and support understanding of the past to better prepare a user for the future. Users can deduce options for the future from the understanding of past decisions, and consequently make better informed decisions.

The technologies can be helpful to those struggling to make decisions about the future. For example, technologies described herein can help a user answer the question "What drove my career up to now?" or "What motivated career decisions in the past?" By assisting user reflection on past decisions, technologies can provide insights into options for the future. For example, by facilitating user reflection, approaches that have been successful in the past can be distinguished, and a user can choose to apply such approaches again in the future.

Beneficiaries include organizations that wish to provide development services for employees. For example, technologies can be provided to employees to facilitate future career decisions. Consumers and other users can also greatly benefit from the technologies because they can simplify a challenging decision-making process.

Example 2—Exemplary Career History

As used herein, the term "career history" includes any information representing or describing different stages in the professional and/or personal growth of a particular individual. For example, a career history can include some or all of the information typically contained in a curriculum vitae, resume, or user profile. However, different information can also be included. A career history can sometimes be referred to as a career path or professional path. In general, as used herein, the term "career" is not intended to be restrictive, but to relate broadly to anything an individual would consider as affecting or impacting his or her professional life.

In any of the examples herein, a stage in a career history of an individual refers to a period of time, phase, or era in an individual's life. Stages can overlap in time or be consecutive. A stage can also relate to a past decision that affected the individual's professional and/or personal growth, such as a transition between phases. A stage in a career history can also be referred to as a career decision or a milestone. Exemplary stages in a career history include: an occupation, a profession, employment or other jobs, education, charity or other volunteer work, projects, promotions, a change in industry or field of work, personal or outside-of-job achievements or activities (e.g. vacations, leave, time off, relocation), etc.

Example 3—Exemplary Career History Exercise

In any of the examples herein, a career history exercise can include any number of steps that are to be performed by a user and that are related to a career history of the user. As part of a career history exercise, the user rates or evaluates different stages in his or her career history. The career stages to be rated can be predetermined or provided by the user. The user reflects on the different career stages and rates each of the stages according to one or more ratings categories. The result of the exercise is a group of user ratings for stages in the user's career history. The exercise can culminate in the presentation to the user of a visualization of the results. The career history exercise can include displaying a user interface to the user via a computing device. User interactions with the user interface are detected by the computing device, and the career stages, ratings and results can be displayed and manipulated based on the detected interactions.

Example 4—Exemplary 3-Step Career History Exercise

An exemplary 3-step career history exercise includes the following three steps: (1) Identify Career Stages; (2) Evaluate Career Stages; and (3) View Results.

In the first step, "Identify Career Stages," a user is asked to look back and identify important milestones or decisions in his or her own career. That is, the user is asked to identify stages in his or her own career history. The user can be asked to identify the most important stages in his or her career (e.g., most valuable, greatest impact, etc.), or to select stages representative of his or her entire career history. Typically, the user identifies these career stages by assigning a descriptive phrase to each stage. The descriptive phase can include any description that sufficiently identifies that particular stage or decision to the user. Typically, the descriptive phrase includes at least a stage name. Exemplary stage names include a job or position title, or a profession. The descriptive phrase can optionally include additional identifying information such as information identifying where a stage took place (e.g., the geographical location and/or the name of a company or business associated with the stage). The descriptive phrase can be created in whole or part by the user, or selected from a profile or database.

Embodiments described herein enable a user to identify three, four or five career stages, however more or fewer career stages can be used. Typically, the user may customize the number of career stages. However, the user's ability to customize the number of stages may be limited by a minimum and/or maximum number.

In the second step of the 3-step career history exercise, "Evaluate Career Stages," the user rates each of the different career stages identified in step one according to one or more ratings categories described herein. For each ratings category, the user can rate the stage according to a numerical scale, such as 1 to 5. However, other ratings systems (e.g., continuous or discrete) can be used. In some embodiments, the ratings are obtained through a touchscreen interface, such as through user tapping, swiping, pinching or flicking (or other gesture) of graphics on a touchscreen display. For example, the touchscreen interface can detect user contact with regions of the touchscreen display. In other embodiments, the ratings are submitted via a keyboard, mouse, or other input device.

In the third step, "View Results," a visualization of the user ratings generated in the second step is provided to the user. In some embodiments, the results are displayed as a visually attractive and simplistic symbol or group of symbols. The descriptive text assigned to the stage (e.g., the stage name) can be displayed with the results. In some examples, the stage name and other descriptive text can be displayed as a pop-up, hover box, or other user interface element. During this step, the user can view his or her own ratings and attempt to derive patterns, interdependencies, and correlations. In some embodiments, the user is able to manipulate the visualization such as through touching, scrolling, bending or magnifying the visualized results. For example, the touchscreen interface can detect user contact with regions of the touchscreen display. In some embodiments, a user can selectively view his or her ratings by ratings category.

Following step three, the user can be better positioned to understand his or her own choices and to apply this knowledge to the potential next step or future decision. The results of the career history exercise can be used in various ways described herein.

The three steps of this exemplary 3-step career history exercise can be performed in various permutations. For example, each step can be completed before the user proceeds to the next step. Alternatively, a step can be partially completed before the user commences or recommences a different step. The user can then return to previous steps to complete them at a later time. For example, a user can identify just one career stage during step one and then proceed to step two to rate the identified stage. Subsequently, the user can identify and rate additional stages. Alternatively, the user can identify all career stages to complete step one, and then proceed to step two to rate all the identified stages at once.

Additionally, a user need not complete the rating of a stage before returning to step one, or rating other stages. For example, a user can rate a first stage according to one or more of the ratings categories, return to stage one to identify a second stage, and then resume rating of the first stage or commence rating of the second stage. In this manner, the user is not restricted by the three steps recited above, but is free to customize his or her own manner of completing the exercise.

Example 5—Exemplary Ratings Categories

In any of the examples herein, ratings categories are the characteristics or dimensions used during a career history exercise to evaluate each stage. Any ratings categories can be used with the examples described herein. The ratings categories can be predetermined or user-selected. In some embodiments, the ratings categories are customizable. For example, a user can define the ratings categories used. Alternatively, a customer could define the ratings categories to be used by a group of individuals (e.g., the customer's employees) performing the career history exercise. In this manner, results can be compared across individuals using the same ratings categories. Ratings categories can be selected to encourage the user to reflect on feelings and attitudes associated with the identified stages.

Embodiments described herein use three ratings categories. However, fewer or more than three ratings categories can be used. As one example, ratings categories can include: Mastery, Purpose, and Autonomy. As another example, ratings categories can include: Fun at Work (or Fun@Work), Growth Pace, and Workload. The category Fun@Work represents the idea that individuals are often good at things that they enjoy working at. A rating in this category represents how much a user enjoyed the specific stage (e.g., how easy was it to get up in the morning, or how much did the user look forward to getting to work). For this category, on a rating scale of 1 to 5, 1 can represent a really dull stage while 5 can represent the greatest fun ever. The category Growth Pace represents the idea that dealing with challenging, yet achievable tasks helps one grow. The category Workload represents the idea that an individual's perceived balance between career and leisure can be a key indicator of purposefully spent life.

Example 6—Exemplary User Interface for Administering a Career History Exercise Using Stage Cards FIG. 1 is an illustration of an exemplary user interface 100 for administering a career history exercise using stage cards 110, 120, 130. Each of the stage cards 110, 120, 130 represents a different stage in a career history of a user, and the stage cards are displayed to the user to facilitate completion of the career history exercise. Although this example includes three stage cards, 110, 120, 130, additional stage cards can be displayed. For example, the user can cause additional stage cards to be presented as part of the user interface 100 by activating a user interface element such as element 108 (e.g., by clicking element 108 with a mouse pointer). In some examples, the user is permitted to add up to two more stage cards so that the user interface 100 includes a total of up to five stage cards.

An interface such as the interface 100 is typically presented to the user at the beginning of the career history exercise. For example, the interface 100 can facilitate user performance of the first step in a 3-step career history exercise. The stage cards 110, 120, 130 are presented together as a group (e.g., all at once) so that the user can select for his or herself where to begin. For example, freeform navigation as described herein can be enabled. Stage cards 120 and 130 are illustrated as empty stage cards. That is, the stages have not yet been "entered" or identified by the user. Stage card 110 includes user interface elements 104 and 102, which can be used by the user to assign descriptive text to the stage represented by stage card 110. However, stage card 110 can also be displayed as an empty stage card.

The element 104 can receive input of a stage name to be assigned to the card 110, and the element 102 can receive input of additional information such as company or location information to be assigned to the card 110. In this example, the appearance of elements 104 and 102 is triggered by movement of the pointer 106 controlled by the user performing the career history exercise. As the cards 120, 130 indicate, a user can "enter" a stage by hovering a pointer over the stage card. The pointer 106 (e.g., controlled by a mouse or other pointing technique) is shown hovering over card 110. Consequently, the card has been activated by the user, and the elements 104, 102 are displayed. Such action by the pointer can be referred to as a roll-over, mouseover, mouse hover, gesture, etc. Stage cards 120, 130 can be activated in a similar manner and likewise assigned descriptive text.

In other examples, stage cards can be activated using a keyboard (e.g., using arrow or other keys) or through a touchscreen interface (e.g., using a touchscreen gesture directed at the stage card). In general, a card is activated when it is selected by a user to be assigned identifying information, and that selection is detected by a computing device displaying the user interface.

The user interface 100 can include additional text. For example, a paragraph or more of text can be included above or below the stage cards 110, 120, 130 providing instructions to the user on how to complete the first step in a 3-step career history exercise. Such instructions can direct the user how to interact with the interface 100 and/or provide natural language descriptions of the steps of the career history exercise.

Example 7—Exemplary Integration with Pre-Existing Career History Data

In some examples herein, the user interface administering the career history exercise is integrated with pre-existing career history data. For example, a user can input information relating to his or her career history into a user profile, upload a CV or resume, or otherwise store career history information in a database. Such information may already have been collected as part of an enterprise resources planning workflow, human resources process, or the like.

The career history data can be accessed while the user is completing the career history exercise to facilitate performance of the steps of the exercise. For example, when a user identifies a stage during the career history exercise, the descriptive text can be provided partially or entirely from the stored career history data.

Example 8—Exemplary Integration of Stage Cards with Pre-Existing Career History Data FIG. 2 is an illustration of exemplary integration using stage cards. FIG. 2 includes an exemplary stage card 210 with user interface elements 204, 202 for assigning descriptive text to the stage card 210. The element 204 can receive input of a stage name to be assigned to the card 210, and the element 202 can receive input of additional information such as company or location information to be assigned to the card 210. In this example, the user has begun to type or enter information (i.e., "Juni") into the element 204. In response, an element 212 is presented to the user that includes a stage name retrieved from stored career history data (i.e., "Junior Developer, ABC Co."). The retrieved stage name matches with the text entered by the user into element 204. The user can select the information in element 212, such as by clicking on it or pressing enter, and the information will be assigned to the stage card 210. The element 212 can be referred to as an autocomplete box or inline help.

Other integration scenarios are also possible. In other examples, the user may assign a stage name to a stage card by selecting from a dropdown list of potential stage names taken from the career history data (e.g., element 212 could include a list of potential stage names). In other examples, the user may be re-directed to a different interface displaying career history data, and the user can select a stage name from the displayed career history data.

Example 9—Exemplary User Interface for Rating Stage Cards Using Ratings Units In some examples herein, ratings units are used to receive and display user ratings of stage cards during performance of a career history exercise. For example, during the second step of a 3-step career history exercise, the ratings units can be used to receive user evaluation of each identified stage according to one or more ratings categories. FIG. 3 is an illustration of an exemplary stage card 310 with exemplary ratings units 340 and descriptive text 304, 302 identifying the stage. Stage card 310 includes a stage name 304, which describes a position held by the user in the past, and additional descriptive text 302, which describes the company where that position was held. In some examples, the ratings units 340 appear on the stage card 310 after the stage card 310 is identified with a stage name 304.

The ratings units in FIG. 3 are presented as three vertically and linearly arranged groups of ratings units. Each vertical arrangement of ratings units corresponds to a different ratings category, and can be referred to as a series or sequence of ratings units. Although this example includes ratings units for three ratings categories, stage cards can include additional ratings units for additional ratings categories. Also, ratings units can be arranged in a different manner than shown in FIG. 3. For example, ratings units can be arranged horizontally or in a non-linear manner Although the ratings units 340 are star-shaped, other shapes are possible. In addition, the ratings units in FIG. 3 represent a rating scale of 1 to 5. In some examples, fewer or more than five ratings units are used in order to represent different ratings scales.

During the evaluation step of the career history exercise, the user reflects on each stage and chooses a rating for that stage for each ratings category. These user ratings can be represented by color-shading of the ratings units. For example, ratings units such as ratings unit 314 are not yet color-shaded, while ratings units 322 and 324 are color-shaded. The user can input his or her ratings using various different input devices (e.g., keyboard, touchscreen etc.). In the example of FIG. 3, the user controls the pointer 306 and clicks on the ratings unit 322 to cause the color-shading. The ratings units below the clicked unit (i.e., unit 324) can automatically color-shade. The hovering of the pointer 306 over individual ratings units can, in some examples, cause the ratings unit to be color-shaded. This color-shading can be lighter or darker than color-shading caused by clicking a unit. However, in such examples, the color-shading is not retained if the pointer is moved off of the ratings unit without clicking the ratings unit.

Optionally, text describing one of the ratings categories can be displayed in response to a user-initiated gesture directed at a ratings unit. For example, in FIG. 3, descriptive text 316 is displayed as a result of the mouse hovering over any ratings units in the first series of vertical ratings units. These ratings units represent the ratings category "Fun@Work." That is, when the user clicks on a ratings unit in that series, the user's rating is indicative of how much fun he or she had during that stage of his or her career history (e.g., when the user was a Junior Developer at ABC Co.). A low number represents less fun and a high number represents more fun. The color-shading of units 322 and 324 represents a user rating of 2 out of 5 for the ratings category of Fun@Work. Typically, the ratings units are color-coded according to ratings categories as described herein.

In FIG. 3, additional text can be displayed above or below the stage card 310. For example, the text can provide instructions to the user on how to complete the second step in a 3-step career history exercise. Such instructions can direct the user how to interact with the ratings units 340 to evaluate the stage represented by card 310 and/or provide natural language descriptions of the steps of the career history exercise. In some examples, a detailed description of the ratings category can appear above or below the card 310 when the mouse hovers over a ratings unit for that ratings category.

Example 10—Exemplary Color Shading and Color Coding

In any of the examples herein, visual depictions of ratings units or segments can be color-shaded to indicate a rating. For example, more color shading indicates a higher rating. Ratings units can be represented by discrete visual depictions (e.g. stars, circles, or the like). To achieve a linear presentation, color shading can proceed from one end of a set of visual depictions to the other end. Color shading can be done in discrete fashion or incremental (e.g., partial shading of a visual depiction to represent a partial ratings unit). Color shading can be achieved by colors, shades, or patterns.

When color-shaded, ratings units for different ratings categories can be color-coded (e.g., of different colors, shades, or patterns) so that the user ratings for the ratings categories are visually distinguishable.

The colors, shades, or patterns can be predetermined or customizable by the user.

Example 11—Exemplary Freeform Navigation User Interface Techniques

In any of the examples herein, navigation throughout the user interface can be achieved via freeform techniques (e.g., out of order). For example, ratings input can be received from a user for any category of any stage at any time during the ratings process. For example, a user can decide to rate the last category of a most recent stage, a middle category of a least recent stage, or any other to start. Navigation can then proceed to any other category in a non-linear, out-of-order fashion. For example, stages can be identified and/or rated out-of-order.

Revisions can also be accomplished. For example, after rating a category for a few stages, a user may change perspective and re-normalize the ratings. Such ratings can be received out of order as described.

Further, as shown, ratings for all stages can be presented on a single page. Navigation to other pages need not be done, allowing the user to fully comprehend the totality of the career path.

Later (e.g., after the ratings are deemed complete), revisions to the ratings can also be achieved in a freeform fashion.

Such techniques can be conducive to putting the user in a state of mind that is appropriate for exploration and decisions in a non-linear, non-conventional, unconstrained manner New connections and trends can be contemplated by users who previously may have constrained their thought processes due to preconceived notions of their career path, which can be challenged by the visualizations described herein.

Example 12—Exemplary Visualizations of Career History Exercise Results Using Stage Cards FIG. 4 is an illustration of an exemplary stage card 450 with ratings units 440 color-shaded according to user ratings of that stage. The stage card 450 also includes a stage name 442. The ratings units 440 are color-coded according to ratings categories. That is, each vertical series of ratings units represents a different ratings category and is therefore color-shaded differently. Stage card 450 can be displayed with additional similar stage cards representing other stages identified and rated during a career history exercise.

FIG. 5 is an exemplary visualization 500 of results of a career history exercise performed using stage cards 510, 520, 530. The stage cards 510, 520, 530 are presented with respective stage names 504, 514, 524 and additional descriptive text 502, 512, 522 identifying the respective stages associated with the cards. The stage cards 510, 420, 530 also include ratings units representing respective user ratings for the stages.

Figure 6:
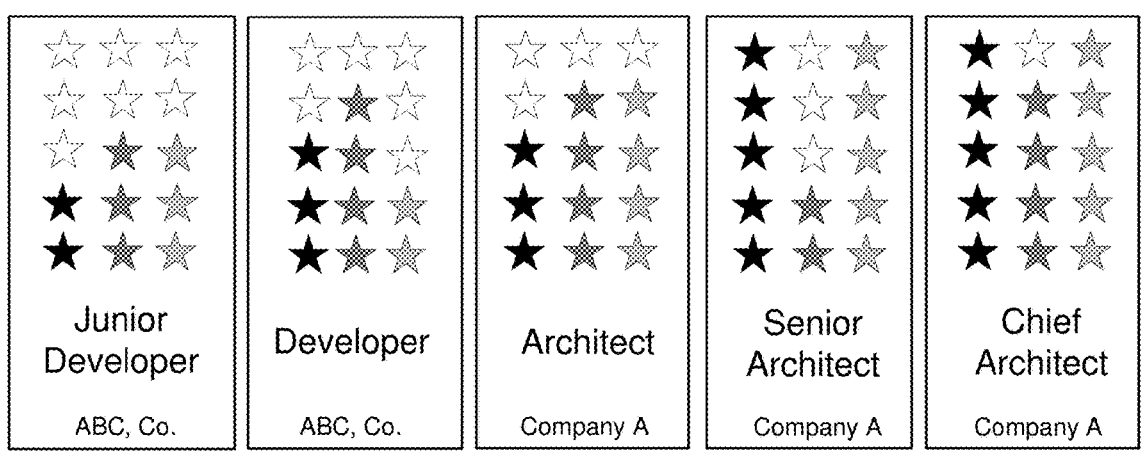
FIG. 6 is a visualization of exemplary results of a career history exercise performed using stage cards.

FIG. 6 is an exemplary visualization 600 of results of a career history exercise performed using stage cards. Each stage card includes a stage name and additional descriptive text identifying the stage associated with the stage card. The ratings units on each stage card are color-shaded according to user ratings of that stage for each of three different ratings categories. Also, the ratings units are color-coded according to ratings category. That is, each ratings category is represented by a different color, shade or pattern. The cards can be presented in chronological order from left to right, where the left-most card represents the oldest stage.

Example 13—Exemplary Selective Viewing of Ratings Categories

In some examples herein, a user interface presenting results of a career history exercise enables a user to manipulate the results. For example, the user interface can provide for selective viewing of ratings categories. That is, the user can select a ratings category and, in response to the selection, the user ratings for the selected category can be presented, while user ratings for other categories are not. The category can be selected through various user input. For example, the user can mouse-click a button, mouse-click a ratings unit, press a key on a keyboard, touch a button or ratings unit on a touchscreen, etc.

Example 14—Exemplary Selective Viewing of Ratings Categories for Stage Cards

FIG. 5 illustrates an example of selective viewing. FIG. 5 includes user interface elements 560, 570, 580, which provide for selective viewing of ratings categories. Specifically, FIG. 5 provides an exemplary visualization 500 of results of a career history exercise performed using stage cards 510, 520, 530. By activating (e.g., clicking or hovering the pointer 506 on) category user interface element 560, the user selects the ratings category of "Fun@Work." Responsive to such activation, ratings units for the ratings category associated with the category user interface element 560 remain shaded while ratings units for the other ratings categories become no longer shaded. Alternatively, the other ratings categories can be removed completely from the visualization. In FIG. 5, the ratings category "Fun@Work" corresponds to the left-most vertical series of ratings units. Thus, ratings units in the vertical series with ratings units 542, 548 and 554 remain shaded. The ratings category "Growth Pace" corresponds to the middle vertical series of ratings units on each card. Because the element 570 is not activated, this ratings category has not been selected. Thus, ratings units in the vertical series with ratings units 544, 550, and 556 are not color-shaded. The ratings category "Workload" corresponds to the right-most vertical series of ratings units on each card. Because the element 580 is not activated, this ratings category has not been selected. Thus, ratings units in the vertical series with ratings units 546, 552, and 558 are not color-shaded.

Figure 7:
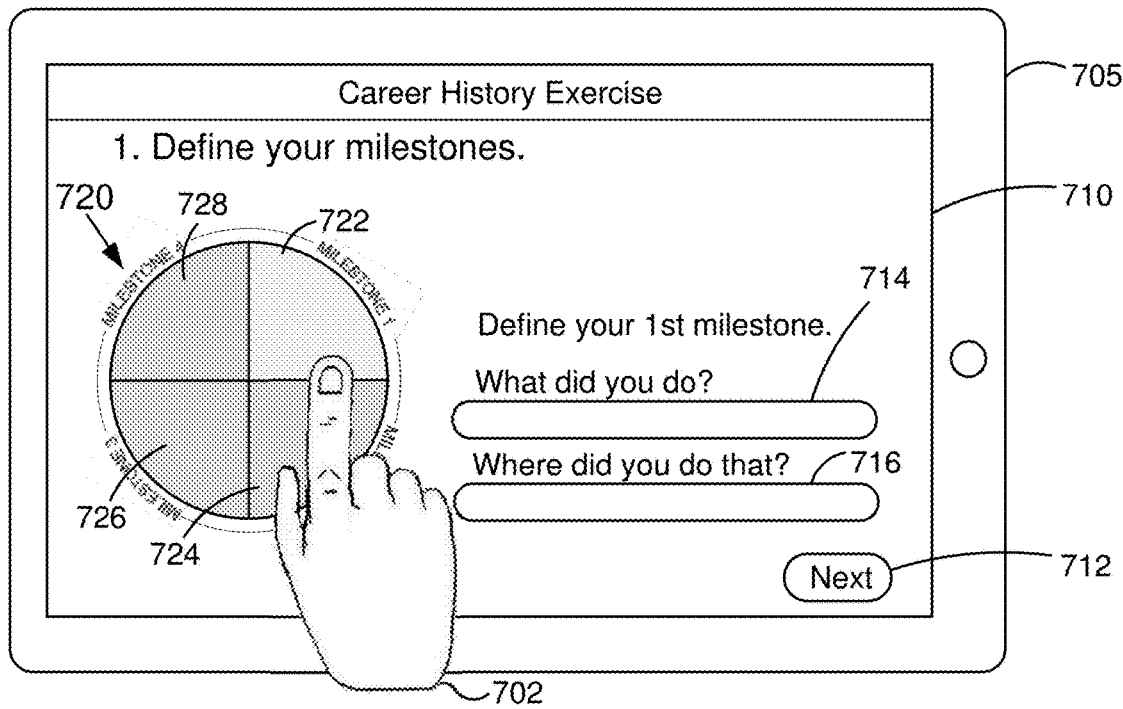
FIG. 7 is a diagram of a touchscreen computing device displaying an exemplary user interface for administering a career history exercise using a milestone circle.

Example 15—Exemplary User Interface for Administering a Career History Exercise Using a Milestone Circle FIG. 7 is an illustration of an exemplary user interface 700 for administering a career history exercise using a milestone circle 720. The milestone circle 720 is displayed to the user to facilitate completion of the career history exercise. The interface 700 is displayed on a touchscreen 710 of a portable computing device 705.

Figure 8:
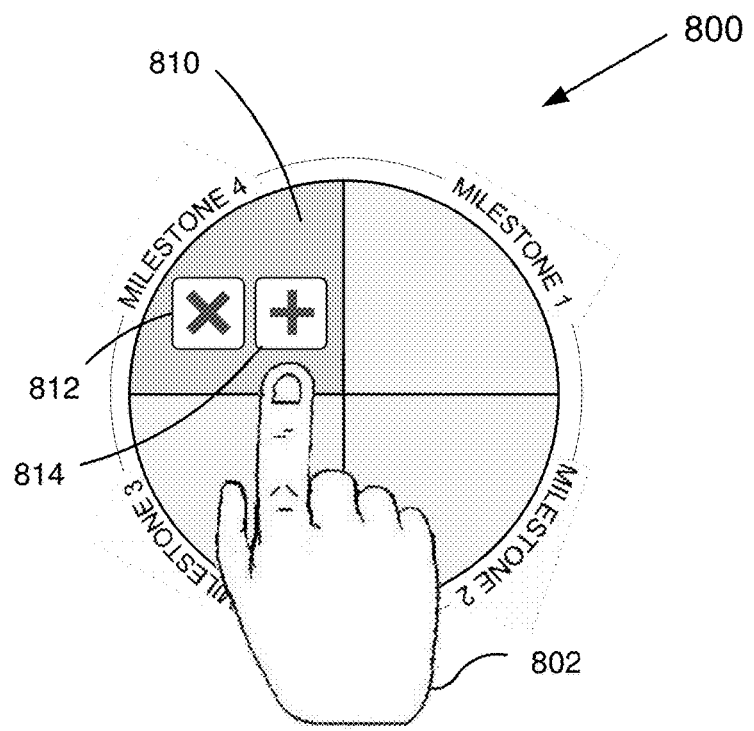
FIG. 8 is an illustration of adding or removing portions of an exemplary milestone circle.

The milestone circle 720 is divided into four portions 722, 724, 726, 728, each representing a different stage or milestone in a career history of a user. Although, in this example, the milestone circle includes four portions 722, 724, 726, 728, additional or fewer portions can be displayed. For example, as shown in FIG. 8, the user can cause additional portions to be presented as part of the milestone circle 800 by activating a user interface element such as element 814 (e.g., by touching element 814). For example, user contact with a region of the touchscreen that corresponds to element 814 can be detected by the computer device 705. Likewise, the user can cause fewer portions to be presented as part of the milestone circle 800 by activating a user interface element such as element 812 (e.g., by touching element 812). Other touchscreen, mouse, or keyboard gestures can also be utilized by the user and detected by the computing device in order to add or remove portions of the milestone circle. In addition, although portions 722, 724, 726, 728 are illustrated as quadrants (i.e., four approximately equally sized sectors) of the milestone circle 720, in some examples, the portions are unequally sized.

An interface such as the interface 700 is typically presented to the user at the beginning of the career history exercise. For example, the interface 700 can facilitate user performance of the first step in a 3-step career history exercise. The user can select for his or herself where to begin the exercise by touching a portion of the milestone circle (e.g., by contacting a region of the touchscreen that corresponds to the portion). For example, the user's hand 702 is shown touching portion 722. Consequently, the user contact with the portion 722 is detected, resulting in activation of the portion 722 by the user. Such action by the user can be referred to as a touchscreen gesture, however other touchscreen gestures can be used to activate portions of the milestone circle 720.

The interface 700 includes user interface elements 714 and 716, which can be used by the user to assign descriptive text to the activated portion 722. The element 714 can receive input of a stage name to be assigned to the portion 722, and the element 716 can receive input of additional information such as company or location information to be assigned to the portion 722. The user can touch the elements 714, 716 in order to begin inputting the descriptive text. For example, a touchscreen keyboard can appear when the elements 714, 716 are touched. The appearance of elements 714 and 716 can be triggered by activation of a portion of the milestone circle 720. Portions 724, 726, 728 can be activated in a similar manner and likewise assigned descriptive text via user interface elements similar to elements 714 and 716. Alternatively, the user can touch the "Next" button 712 to activate and advance to the next portion.

In some examples herein, the user interface 700 is integrated with pre-existing career history data as described herein. The career history data can be accessed while the user is completing the career history exercise to facilitate performance of the steps of the exercise. For example, a user can begin to input text into element 714, and a stage name that matches the input text can be retrieved from stored career history data. The retrieved stage name can be presented to the user (e.g. to allow autocompletion of the field), and the user can choose whether to select the retrieved stage name.

The user interface 700 can include additional text. For example, a paragraph or more of text can be included providing instructions to the user on how to complete the first step in a 3-step career history exercise. Such instructions can direct the user how to interact with the interface 700 and/or provide natural language descriptions of the steps of the career history exercise.

Although the interface 700 is illustrated on a touchscreen device, the interface 700 can also be displayed on other devices without a touchscreen. Without a touchscreen, portions of the milestone circle 720 can be activated using a keyboard (e.g., using arrow or other keys), using a mouse (e.g., using a mouse gesture such as hovering or clicking), or by other form of selection by a user.

Example 16—Exemplary User Interface for Rating Portions of a Milestone Circle

In some examples herein, ratings units and/or ratings segments are used to receive and display user ratings of stages (e.g. milestones) during performance of a career history exercise using a milestone circle. For example, during the second step of a 3-step career history exercise, the ratings units can be used to receive user evaluation of each stage according to one or more ratings categories.

Figure 9:
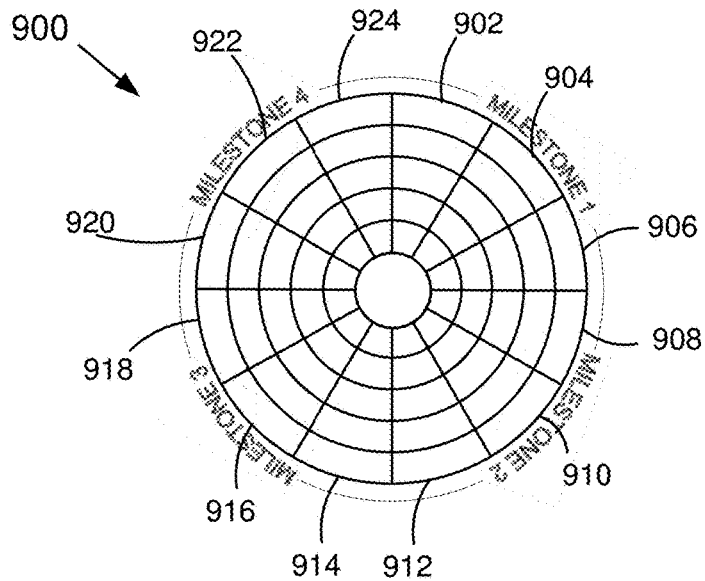
FIG. 9 is an illustration of an exemplary milestone circle portioned into segments.

FIG. 9 illustrates an exemplary milestone circle 900 divided into four portions, with each portion partitioned into three segments. That is, segments 902, 904, 906 correspond to a first portion representing a first stage in a career history of a user. Segments 908, 910, 912 correspond to a second portion representing a second stage in the career history. Segments 914, 916, 918 correspond to a third portion representing a third stage in the career history. Segments 920, 922, 924 correspond to a fourth portion representing a fourth stage in the career history.

Each of the segments within each portion corresponds to a different ratings category. Segments 902, 908, 914, 920 can be used to display user ratings in a first ratings category, such as Fun@Work, for the corresponding stage. Segments 904, 910, 916, 922, can be used to display user ratings in a second ratings category, such as Growth Pace, for the corresponding stage. Segments 906, 912, 918, 924 can be used to display user ratings in a third ratings category, such as Workload, for the corresponding stage. Although milestone circle 900 illustrates portions partitioned into three segments, more or fewer segments can be used depending on the number of ratings categories used.

Segments 902, 904, 906, 908, 910, 912, 914, 916, 918, 920, 922, 924 are also shown to be divided each into five ratings units. These units facilitate receiving and displaying of user ratings on a scale of 1 to 5. Additional or fewer ratings units can be used depending on the ratings scale. In some examples, the user ratings are made on a continuous scale, and the segments may or may not include ratings units. The ratings units in FIG. 9 are concentric, arc-shaped units. However, other shapes are possible. As in the example, all the ratings units need not be of uniform size.

Example 17—Exemplary User Interface for Displaying User Ratings

Figure 10:
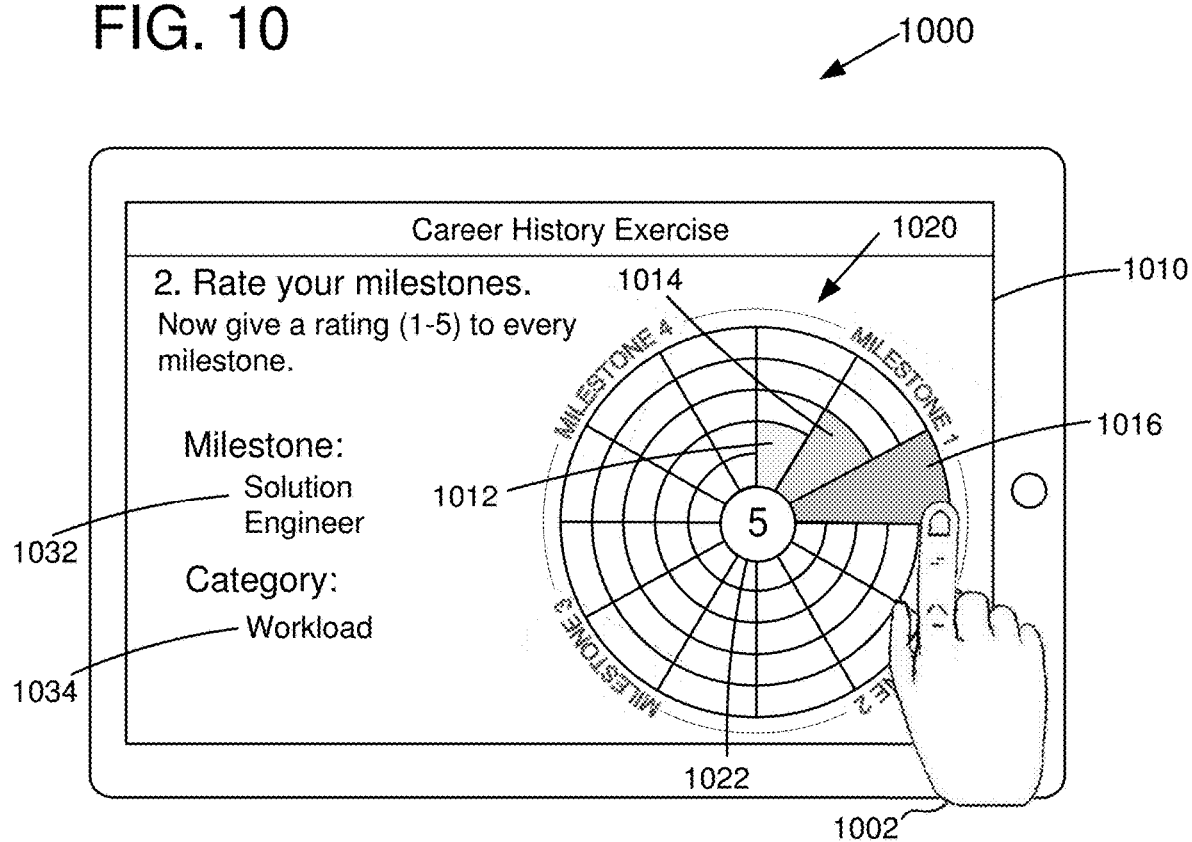
FIG. 10 is an illustration of a portion of an exemplary milestone circle color-shaded according to user ratings in three different ratings categories.

FIG. 10 illustration of an exemplary user interface 1000 displayed on a touchscreen 1010. The user interface 1000 includes one portion of a milestone circle 1020 color-shaded according to user ratings 1012, 1014, 1016 in three different ratings categories. The milestone circle 1020 is divided into four quadrants each representing a different stage or milestone in a career history of a user. Each portion of the milestone circle 1020 is partitioned into three segments, which each represent a different ratings category. Because milestone circle user ratings resemble a flower, it is sometimes called a "flower" visualization.

During the evaluation step of the career history exercise, the user reflects on each stage and chooses a rating for that stage for each ratings category. These user ratings can be represented by color-shading of the segments and/or ratings units. For example, segments 1012, 1014, 1016 are color-shaded based on user ratings.

Descriptive text 1032 identifies the stage that corresponds to the activated portion of the milestone circle 1020 (e.g., the portion that the user is currently rating). The descriptive text includes a stage name 1032, which describes a position held by the user in the past. Additional descriptive text, such as text describing the company where that position was held, can also be displayed. Descriptive text, such as text 1034, describing one of the ratings categories can be displayed in response to a user-initiated gesture directed at a ratings unit or milestone circle segment. For example, by touching one of the ratings units in a ratings segment (e.g., by contacting a region of the touchscreen 1010 corresponding to the ratings unit), the name of the ratings category corresponding to that segment can be displayed (e.g., detection of the user contact causes the name to be displayed). Text 1032, 1034 indicates that the user 1002 is currently rating the stage "Solution Engineer" according to the ratings category "Workload." Displaying of text 1032, 1034 is optional, as is the remainder of the text on the interface 1000.

The user can input his or her ratings using various different input devices (e.g., keyboard, touchscreen etc.). In the example of FIG. 10, a user rates the stage by touching, tapping, or otherwise contacting a ratings unit with his or her hand 1002. This action causes the color-shading. The ratings units can automatically color-shade from the center of the milestone circle to the touched ratings unit. The user can move or drag his or her finger along the ratings units to change the size of the color-shaded region, representing his or her rating of the ratings category. The value for the user rating can be displayed, such as at the center 1022 of the milestone circle 1020.

The color-shaded segment 1012 represent a rating of 2 out of 5 for a first ratings category, such as Fun@Work. The color-shaded segment 1014 represents a user rating of 3 out of 5 for a second ratings category, such as Growth Pace. The color-shaded segment 1016 represents a user rating of 5 out of 5 for a third ratings category, Workload.

Typically, the ratings segments are color-coded according to ratings categories. That is, when color-shaded, ratings units for each ratings category are a different color or pattern so that the user ratings for each ratings category are visually distinguishable. For example, segments 1012, 1014, 1016 are each shaded a different shade of gray. The colors can be predetermined or customizable by the user.

Additional text can be displayed as part of the user interface 1000. For example, the text can provide instructions to the user on how to complete the second step in a 3-step career history exercise. Such instructions can direct the user how to interact with the milestone circle 1020 to evaluate the stages in his or her career history and/or provide natural language descriptions of the steps of the career history exercise. In some examples, a detailed description of the ratings category can appear with the text 1034.

Figure 11:
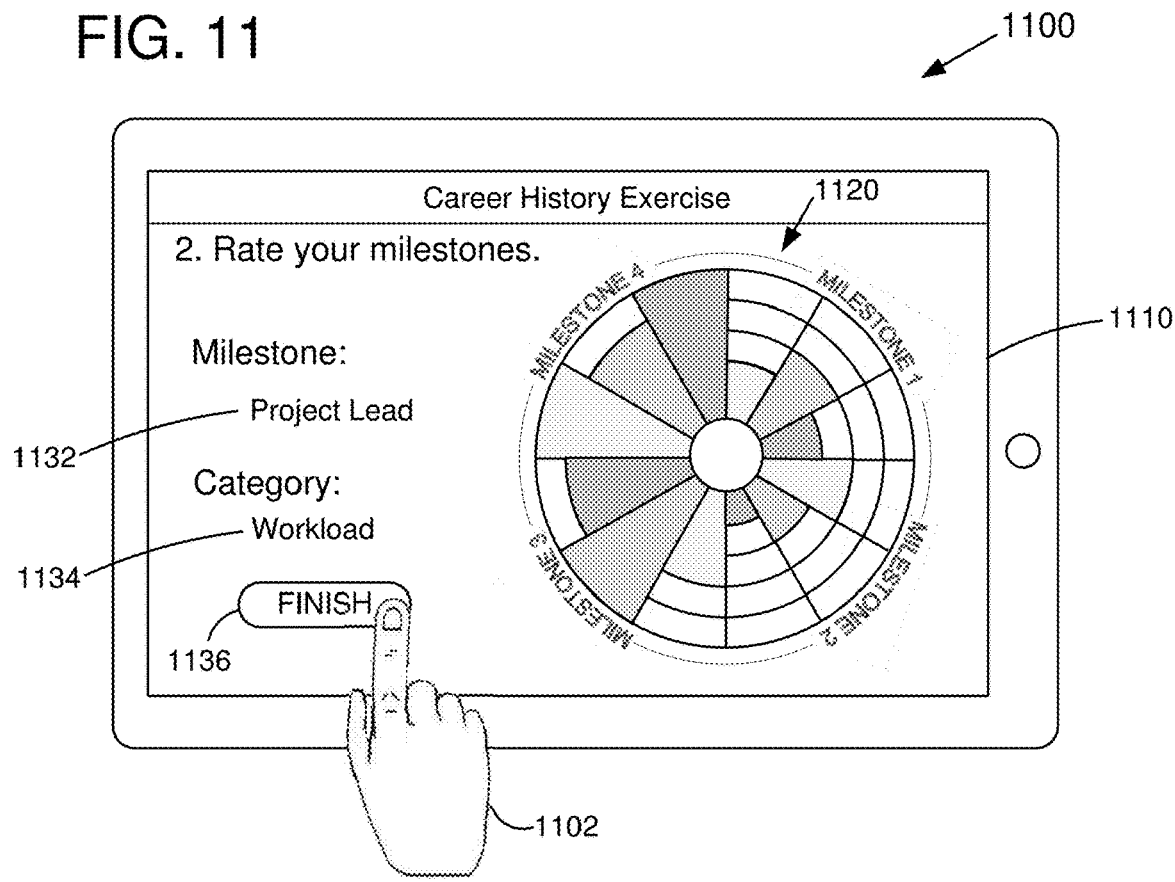
FIG. 11 is an illustration of user ratings for four portions of an exemplary milestone circle.

Example 18—Exemplary Visualizations of Career History Exercise Results Using Milestone Circles FIG. 11 is user interface 1100 displaying user ratings for four portions of an exemplary milestone circle 1120 on a touchscreen 1110. That is, the segments of the milestone circle 1120 are color-shaded according to user ratings of four stages (e.g., milestones) in his or her career history. The color-shaded segments are color-coded according to ratings categories. That is, each segment of ratings units in each portion of the milestone circle 1120 represents a different ratings category and is therefore color-shaded differently. More or fewer segments can be displayed as part of the milestone circle 1120, depending on the number of ratings categories used. Likewise, more or fewer portions can be displayed as part of the milestone of 1120, depending on the number of stages being rated.

Figure 12:
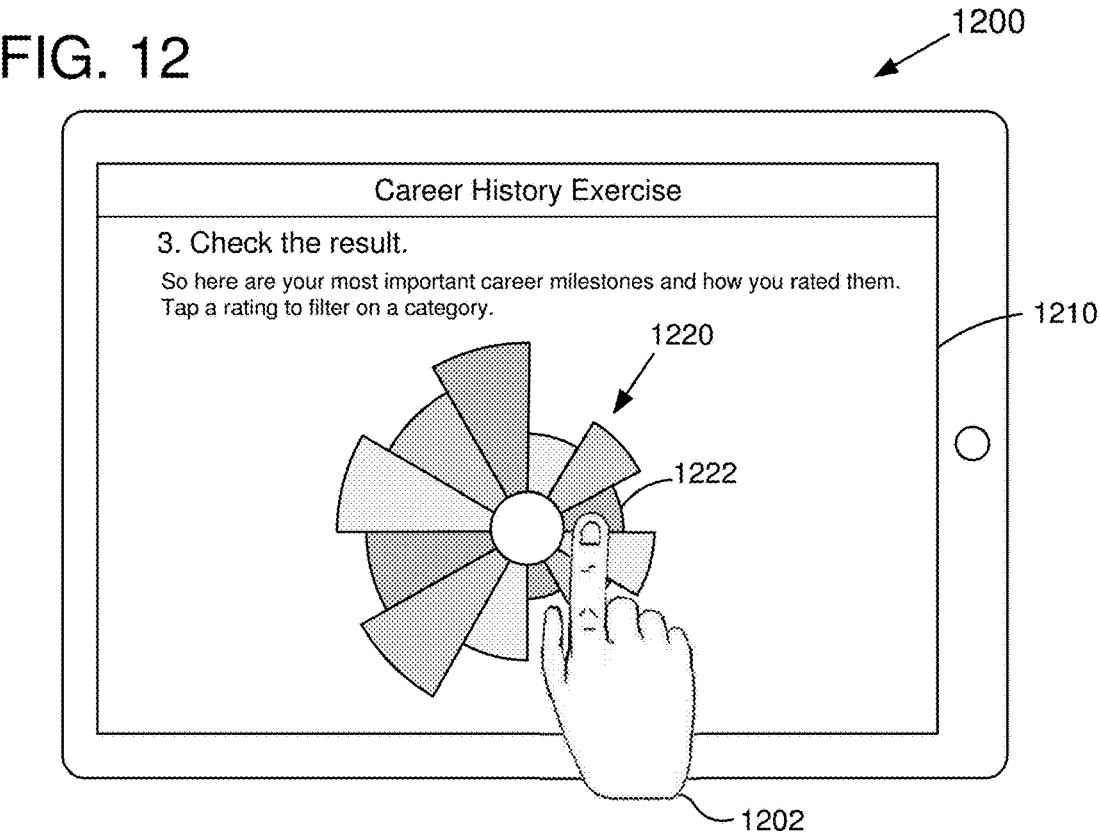
FIG. 12 is an illustration of exemplary results of a career history exercise performed using a milestone circle.

Descriptive text 1132 identifies the stage that corresponds to the activated portion of the milestone circle 1020 (e.g., the portion that the user just finished rating). The descriptive text includes a stage name 1032, which describes a position held by the user in the past. Additional descriptive text, such as text describing the company where that position was held, can also be displayed. Descriptive text, such as text 1034, describing one of the ratings categories, identifies the ratings category that the user just finished rating. The user interface 1100 can include a button such as 1136 that a user can touch to indicate completion of the career history exercise. Subsequent to touching the button 1136, results of the career history exercise can be displayed, such as part of a user interface 1200. For example, the results can be displayed responsive to detection of user contact with the button 1136. FIG. 12 is an illustration of exemplary results of a career history exercise performed using a milestone circle 1220, and displayed on a touchscreen 1210.

Figure 14:
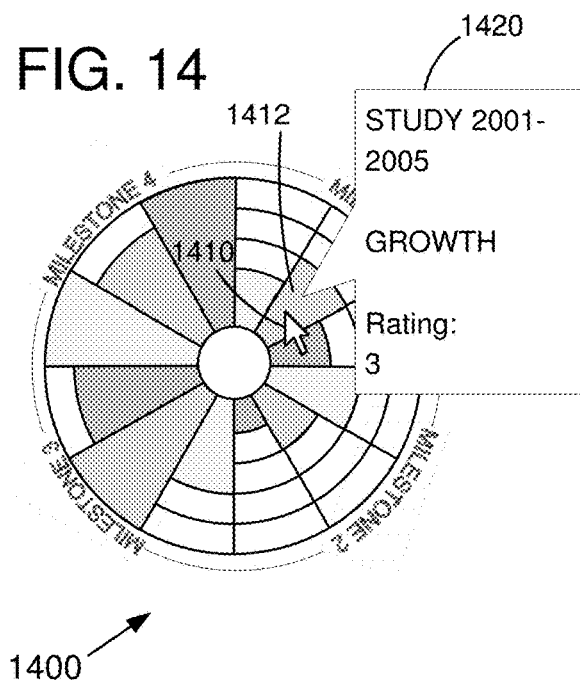
FIG. 14 is an illustration of exemplary results of a career history exercise performed using a milestone circle with an exemplary pop-up with descriptive text.

FIG. 14 is an exemplary visualization 1400 of results of a career history exercise performed using a milestone circle. Each of the segments for each portion of the milestone circle is color-shaded according to user ratings of that stage for each of three different ratings categories. That is, each ratings category is represented by a different color, shade or pattern. In this example, a window 1420 (e.g., a text box, pop-up window, hover box, etc.) appears in response to hovering of a mouse pointer 1410 over a color-shaded segment 1412. The window 1420 can include information related to the segment 1412. For example, the window 1420 can list the stage name for that portion of the milestone circle (e.g., Study 2001-2005), the particular ratings category represented by the segment 1412 (e.g., growth), and the user rating for that portion and ratings category (e.g., 3). Although the window 1420 is shown to appear on top of the milestone circle, the window can be displayed next to the milestone circle, or in another region of the user interface. Also, in other examples, a window such as window 1420 can appear in response to detection of user touching, tapping, or other contact with a touchscreen, or other user input.

Figure 15:
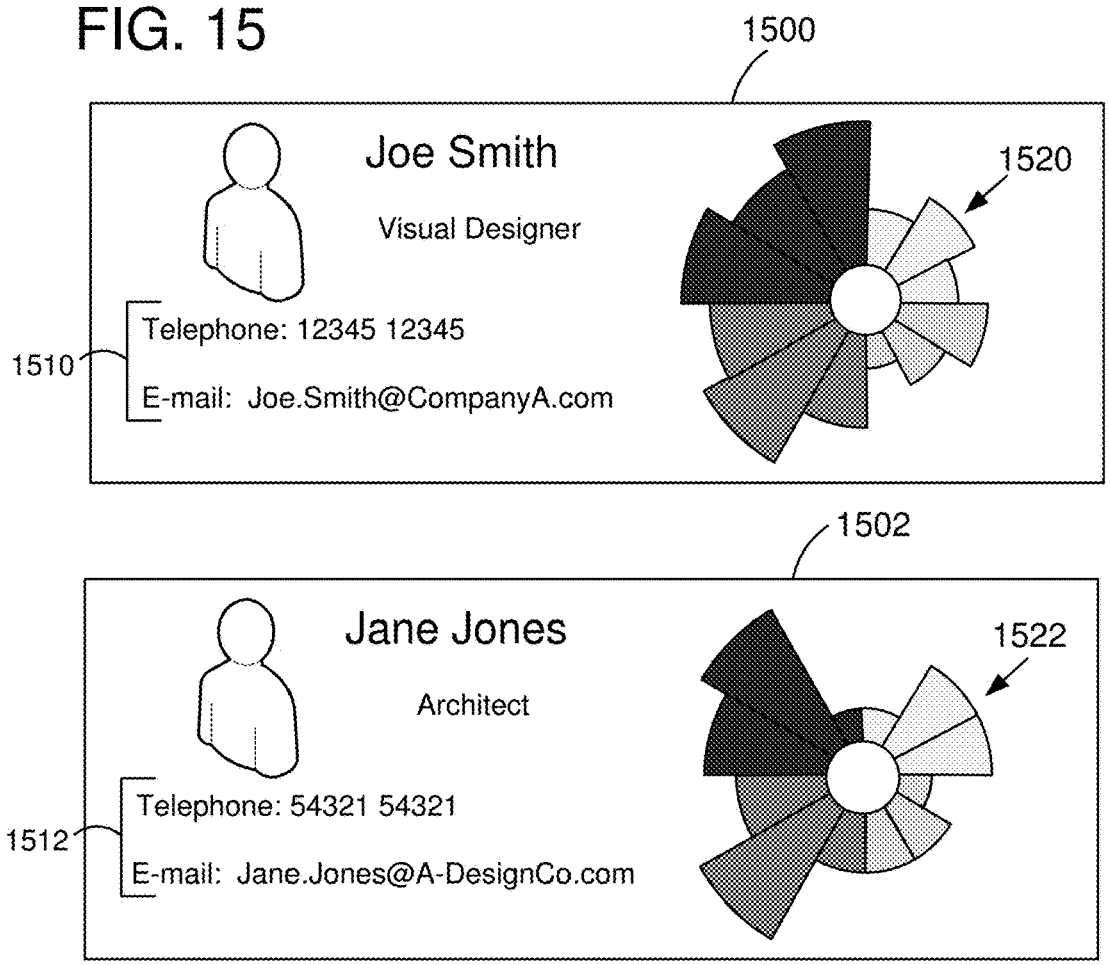
FIG. 15 is an illustration of exemplary results of a career history exercise performed using a milestone circle with user-identifying information.

FIG. 15 is an exemplary visualization of results of a career history exercise performed by two different users. The results for Joe Smith 1500 are displayed as milestone circle 1520, while the results for Jane Jones 1502 are displayed as milestone circle 1522. The ratings segments in FIG. 15 are color-coded according to career history stage. That is, the ratings segments for each of the four career history stages are shaded differently to be visually distinguishable. Upon completion of a career history exercise, a milestone circle can be displayed with user identifying information and posted on a local network, personal webpage, social network, etc. In FIG. 15, the milestone circle 1520 is displayed with information 1510 identifying the user, Joe Smith, who completed the career history exercise, which produced the milestone circle 1520. Likewise, the milestone circle 1522 is displayed with information 1512 identifying the user, Jane Jones, who completed the career history exercise, which produced the milestone circle 1522. The visualizations 1500, 1502 can be compared to standard business cards.

Although some visualizations and user interfaces described herein are illustrated on touchscreen devices, such visualizations and user interfaces can also be displayed on non-touchscreen computing devices. Also, although certain color-shading/color-coding schemes are illustrated in the figures, other schemes can be used. For example, color schemes can be personalized or customized by the user following completion of the career history exercise.

Because visualizations of the results of a career history exercise administered using a milestone circle resemble a flower, these visualizations can be referred to as "flower" visualizations.

Figure 13:
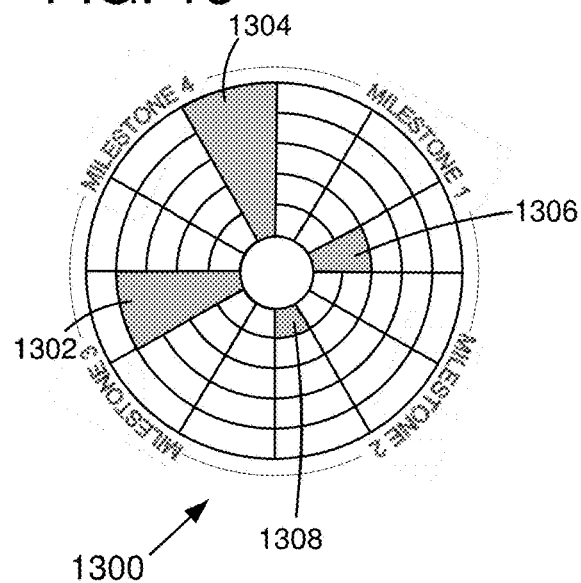
FIG. 13 is an illustration of selective viewing of ratings categories of a milestone circle.

Example 19—Exemplary Selective Viewing of Ratings Categories for Milestone Circle An example of selective viewing of ratings categories is illustrated in FIG. 13. FIG. 13 includes color-shaded segments 1302, 1304, 1306, 1308 of a milestone circle 1300. The segments represent user ratings of different career history stages for one ratings category. Each of the segments 1302, 1304, 1306, 1308 is positioned within a different portion of the milestone circle 1300, and therefore each segment corresponds to a different stage. The segments 1302, 1304, 1306, 1308 can correspond to user ratings for the ratings category Workload. The segments 1302, 1304, 1306, 1308 can be displayed with or without the circle 1300. Also, segments 1302, 1304, 1306, 1308 can be displayed with descriptive text indicating which ratings category is being viewed (e.g., identifying the category as "Workload"). The user can select the ratings category for viewing by clicking or touching a button displayed as part of the user interface, pressing a key on a keyboard, contacting a ratings unit on the milestone circle 1300, or other user-initiated input. For example, a description of a ratings category can be displayed responsive to detection of the user input used to select the ratings category.

FIG. 12 is an illustration of a user interface 1200 displaying exemplary results of a career history exercise performed using a milestone circle 1220, and displayed on a touch-screen 1210. The user interface 1200 can be configured to enable a user to manipulate the results 1220. For example, the user interface 1200 can be configured to enable selective viewing of ratings categories. By touching a segment, such as segment 1222 (e.g., by contacting a region of the touch-screen 1210 corresponding to the segment), the user selects one ratings category for viewing. Consequently, responsive to detection of the user contact with the segment, ratings units for that ratings category remain shaded while ratings units for the other ratings categories become no longer shaded, or are no longer displayed. In FIG. 12, the segment 1222 can correspond to the ratings category Workload. Thus, ratings segments representing user ratings of Workload, such as segments 1302, 1304, 1306, 1308 of FIG. 13, remain shaded in response to the user touching of segment 1222. The user can selectively view different ratings categories by touching different segments of the milestone circle 1220.

Example 20—Exemplary Uses of Career History Exercise Results

In some examples herein, visualizations of career history exercise results can be posted to a personal or professional webpage, or otherwise presented to others as part of a personal or professional identity. Visualizations can be used to promote an individual's professional brand, including a summary of the individual's overall set of experiences, skills, strengths, network connections and learning from the past. For example, FIG. 15 includes a visualization of career history results for an individual, John Smith, on a milestone circle 1520 as part of a business card 1500, as well as a visualization of career history results for an individual, Jane Jones, on a milestone circle 1522 as part of a business card 1502. Visualizations can be integrated into a personal profile, such as on a public social networking website or an internal website. For example, visualizations can be posted as part of a user profile.

The visualizations are likely to vary between individuals, and thus can be used to visually compare individuals. For example, the visualization can act as a type of fingerprint. Differences and similarities between individuals can be quickly recognized through visual comparisons by displaying two or more visualizations proximate one another. Consequently, the visualizations can be used for making managerial, hiring or other decisions. For example, the milestone circles 1520 and 1522 in FIG. 15 can be visually compared to quickly discern the different career paths and decisions of John Smith and Jane Jones.

Example 21—Exemplary Analytics

In any of the examples herein, analytics can be used to process the results of a career history exercise. As stated above, the career history exercise results are likely to vary between individuals. Thus, the results can be quantified and used to compare individuals. For example, a distance function can be defined, and those individuals within a certain threshold distance of a particular individual can be determined. Other analytics can take distinctive characteristics of an individual (e.g., department, tenure, office location, or the like) into account for grouping individuals to calculate averages, minimums, maximums, trends, and the like. As another analytics example, career history exercise results can be quantified with a single score (e.g., a vector). The score can be compared across employees or individuals, such as by comparing scores stored in a database.

Visual analytics can also be supported. For example, visualizations of career history exercise results from two or more individuals can be graphically overlayed and compared to determine a percentage of overlap or similarity. If visualizations for two individuals have a high percentage of overlap, the two individuals can be said to have led similar career paths, or to choose similar lifestyles.

Predictive analytics can also be supported. For example, patterns can be determined from career history exercise results of an individual or group of individuals, such as by calculating correlation statistics for one or more ratings categories over several career decisions. These patterns or correlations can be used to predict future career decisions. For example, the assumption can be made that the patterns or correlations will remain true for future career decisions. For example, if a particular individual demonstrates a strong correlation between "Fun@Work" and "Growth Pace" ratings categories over a number of career stages, that individual is likely well-suited for a future job having a similar correlation. Also, the individual is likely to prefer, or find more attractive, a job with a lot of potential in both of these areas (e.g., to have a lot of "learning=growth" potential). Correlations can be used in a similar manner for groups of individuals (e.g., by calculating correlation statistics for one or more ratings categories over career decisions of the group). For example, correlations can be aggregated for a group of individuals and used to design development programs, such as temporary job assignments for employees with high potential.

Predictive analytics can be useful, for example, for "Succession Planning" (e.g., identification of and career planning for individuals with talents to fill potential key positions) or "Talent Pool Development" (e.g., identification of individuals for talent development, creating a development plan, etc.).

Groups of individuals can be compared using these and other analytics to uncover similarities and differences, and to assist in managerial, hiring, career and other decision-making processes.

Example 22—Exemplary Cloud Computing Implementation

Any of the technologies described herein can be implemented using cloud computing techniques, wherein a user can perform a career history exercise and/or view visualizations of results from a career history exercise via a rich internet application that accesses resources that have been purchased in a software-as-a-service scenario.

Example 23—Exemplary Decision History Embodiment

Visualizations and exercises described herein can be used to facilitate user insight into decisions other than career decisions. That is, career history exercises described herein can be generalized to any decision history. For example, a decision history exercise can be used to assist a user in deciding what book to read next, where to plan the next vacation, or what city to live in next. As part of the decision history exercise, the user rates or evaluates different past decisions. The user reflects on the different decisions and rates each of the decisions according to one or more ratings categories. For example, the user can rate books previously read on categories such as: page length, time to completion, and interest level. As another example, a user could rate vacation decisions based on categories such as: fun, expense, and distance. The result of the exercise is a group of user ratings for each of the decisions in the user's decision history. The exercise can culminate in the presentation to the user of a visualization of the results.

For example, the user interface 700 can be modified to administer a decision history exercise, with the milestone circle 720 modified as a decision circle 720. The decision history circle 720 can facilitate user completion of the decision history exercise in a similar manner to a milestone circle.

Example 24—Exemplary Method of Presenting a User Interface With Stage Cards

Figure 16:
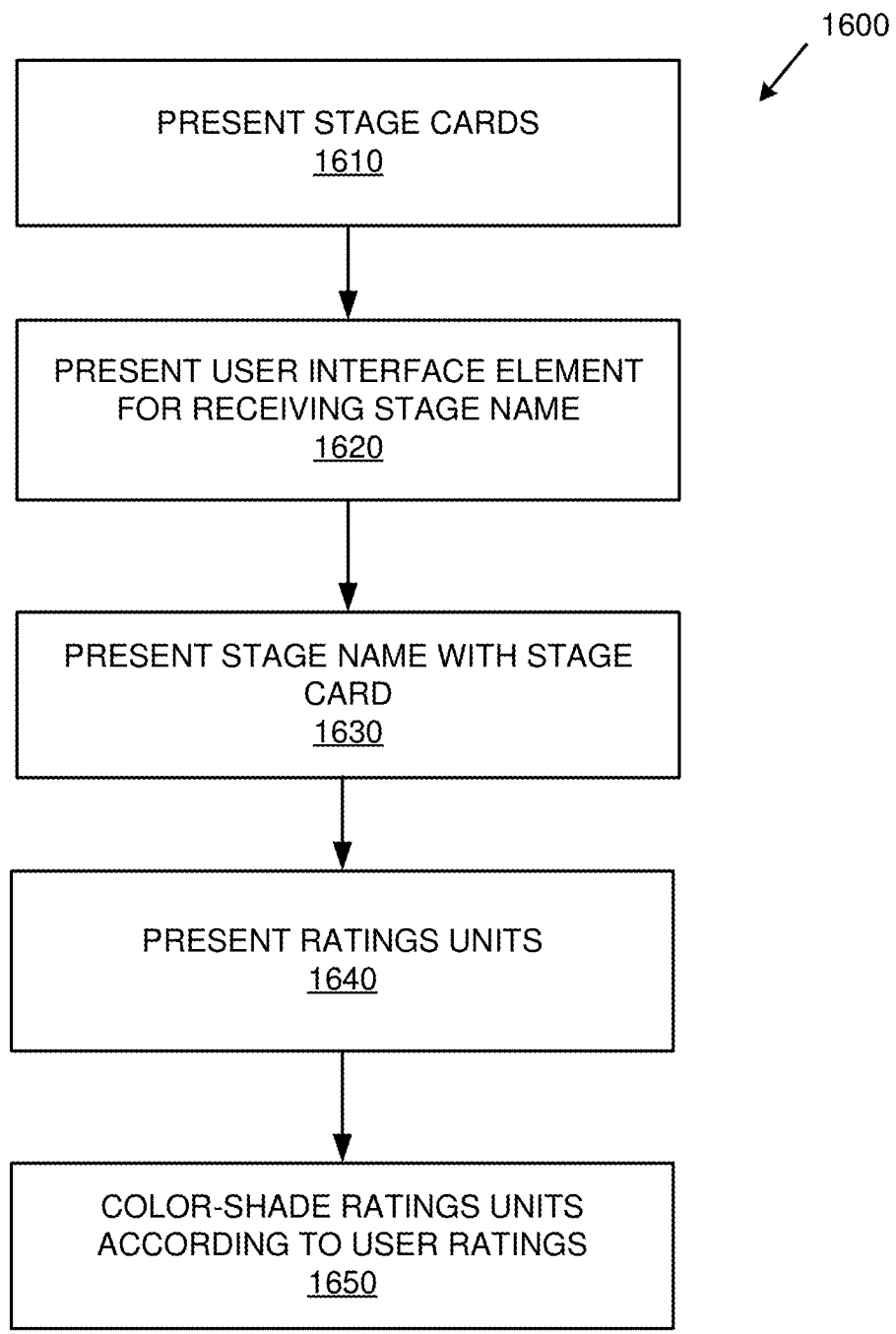
FIG. 16 is a flowchart of an exemplary method for presenting on a display a user interface for facilitating user evaluation of past career decisions with stage cards.

FIG. 16 is a flowchart of an exemplary method 1600 for presenting on a display a user interface for facilitating user evaluation of past career decisions. Such a method can be used in conjunction with the user interfaces shown in FIGS. 1-6.

At 1610, stage cards are presented. The stage cards represent different stages in a career history of the user. At least three stage cards can be presented as a group (e.g., together on the display). The stage cards can be operable to permit freeform navigation. At 1620, a user interface element for receiving a stage name is presented. The user interface element can be presented in response to activation of one of the stage cards. For example, the user interface element can be presented in response to input received from a user, such as a pointer hovering over or clicking the one stage card. The stage name can received as user input via the user interface element. At 1630, a stage name is presented with the activated stage card. For example, the stage name can be presented on the activated stage card.

At 1640, ratings units are presented. The ratings units can be presented so that a group of ratings units on each stage card corresponds to each ratings category. For example, if three ratings categories are used, the ratings units can be presented in three groups on each stage card, one group for each ratings category. These groups of ratings units can be referred to as a series of ratings units. At 1650, ratings units are color-shaded according to user ratings of the career history stages (e.g., determined via reception of user activation of visual depictions of the ratings units). For example, the color-shading can be caused by interpretation of user clicking of individual ratings units. The color-shading can be color-coded according to ratings category.

Figure 17:
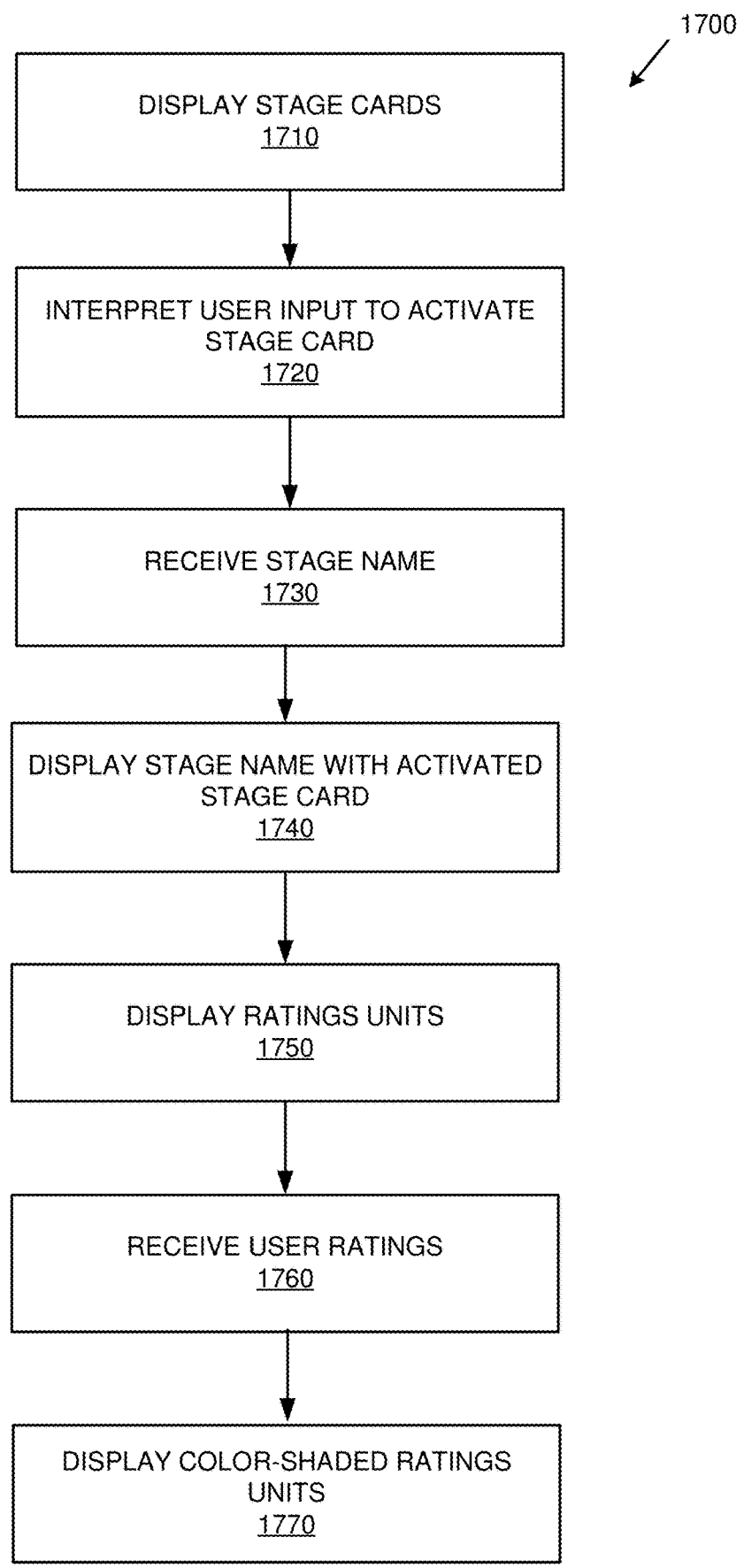
FIG. 17 is a flowchart of an exemplary method for administering a career history exercise using stage cards.

Example 25—Exemplary Method of Administering a Career History Exercise With Stage Cards FIG. 17 is a flowchart of an exemplary method 1700 for administering a career history exercise. Such a method can be used in conjunction with the user interfaces shown in FIGS. 1-6.

At 1710, stage cards are displayed. The stage cards are operable to be associated with a stage in a career history of a user. At 1720, user input is interpreted as an activation of one of the displayed stage cards. For example, mouse clicking or hovering over a given one of the displayed stage cards can be received and interpreted as activation of the given stage card. At 1730, a stage name is received for the activated stage card. For example, input of the stage name can be received from the user, or the stage name can be retrieved from a database, such as from stored career history data. At 1740, the stage name is displayed with the activated stage card.

At 1750, ratings units are displayed with the activated stage card. The ratings units represent three or more ratings categories. For example, the ratings units can be displayed in groups on the activated stage card, and different groups can represent different ratings categories. At 1760, user ratings are received. The user ratings are for the stage that corresponds to the activated stage card, in the different ratings categories. For example, user ratings can be received by interpreting user clicking of ratings units, or by interpreting user keyboard entries. At 1770, user ratings are displayed as color-shaded ratings units on the activated stage card. The color-shading can be color-coded according to ratings category.

Parts of the method 1700 can be repeated or performed more than once so that additional stage cards are activated, assigned a stage name, and displayed with ratings units. For example, 1720, 1730, 1740, 1750, 1760, 1770 can be performed again and directed at a second one of the displayed stage cards. For example, 1720, 1730, 1740, 1750, 1760, 1770 can be repeated until all of the stage cards are assigned and presented with respective stage names, displayed with ratings units, and displayed with color-shaded ratings units.

In addition, the method 1700 can be performed in any order or combined with other methods so as to enable freeform navigation. For example, after 1740, parts 1720, 1730, 1740 of the method 1700 can be performed again and directed at a second one of the displayed stage cards before other parts of the method 1700 are performed. For example, more than one stage card can be displayed with a respective stage name before ratings units are displayed. For example, ratings units can be displayed for more than one stage card before user ratings are received. Other permutations than these are likewise possible.

Figure 18:
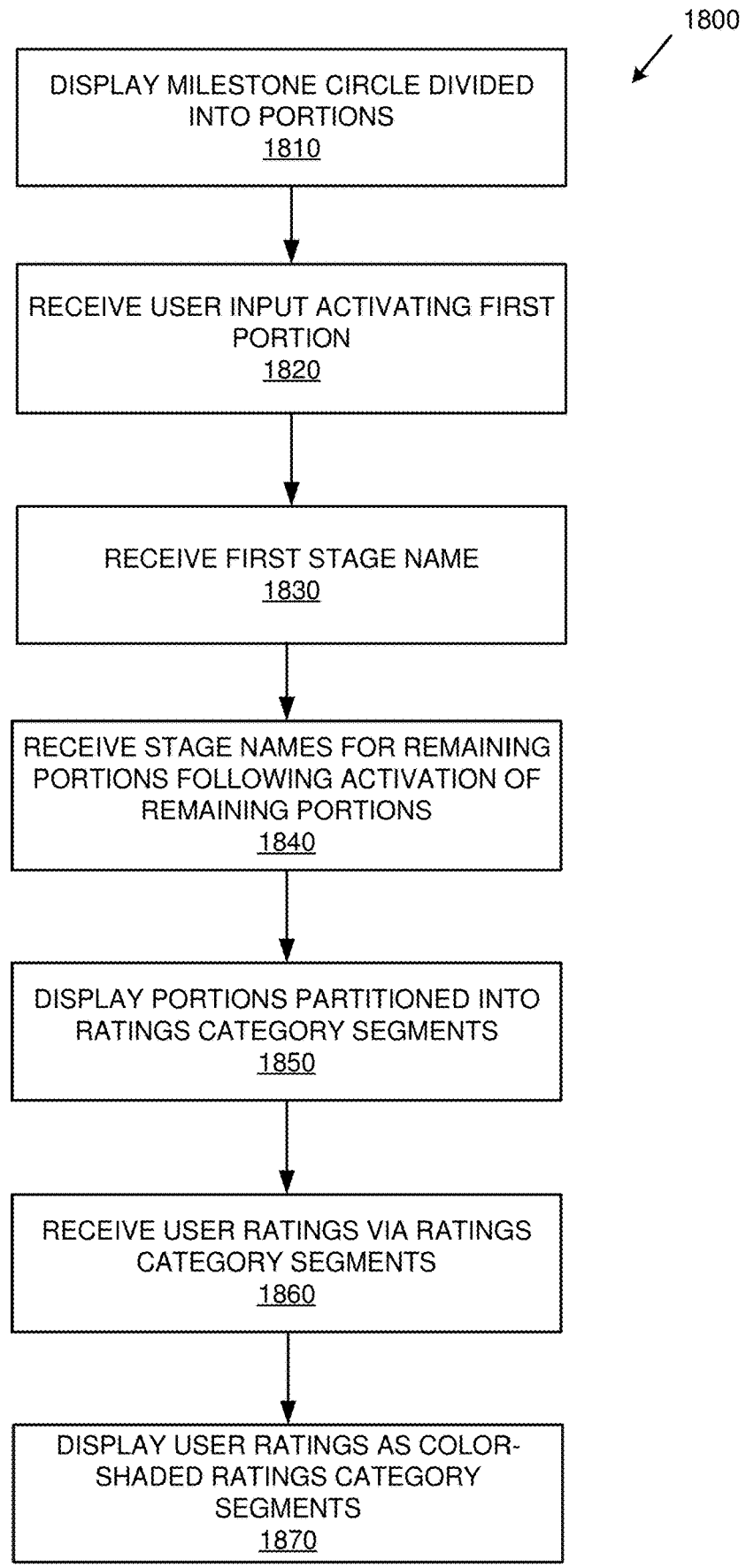
FIG. 18 is a flowchart of an exemplary method for administering a career history exercise using a milestone circle.

Example 26—Exemplary Method of Administering a Career History Exercise with a Milestone Circle FIG. 18 is a flowchart of an exemplary method 1800 for administering a career history exercise and for visualizing results of the career history exercise. Such a method can be used in conjunction with the user interfaces shown in FIGS. 7-15.

At 1810, a milestone circle divided into portions is displayed. The portions represent different stages in a career history of a user. At 1820, user input activating a first portion is received. For example, the milestone circle can be displayed on a touchscreen, and user contact with a region of the touchscreen corresponding to the first portion can be received and interpreted as activation of that portion. At 1830, a first stage name is received. For example, input of the stage name can be received from the user, or the stage name can be retrieved from a database, such as from stored career history data. The first stage name is assigned to the first portion. At 1840, stage names for remaining portions are received. The stage names are received following activation of the remaining portions. At 1850, portions of the milestone circle partitioned into ratings category segments are displayed. At 1860, user ratings are received via the ratings category segments. For example, user contact with a region of the touchscreen corresponding to a ratings category segment can be detected and interpreted as a user rating. At 1870, user ratings are displayed as color-shaded ratings category segments. The color-shaded segments can be color-coded according to ratings categories.

Figure 19:
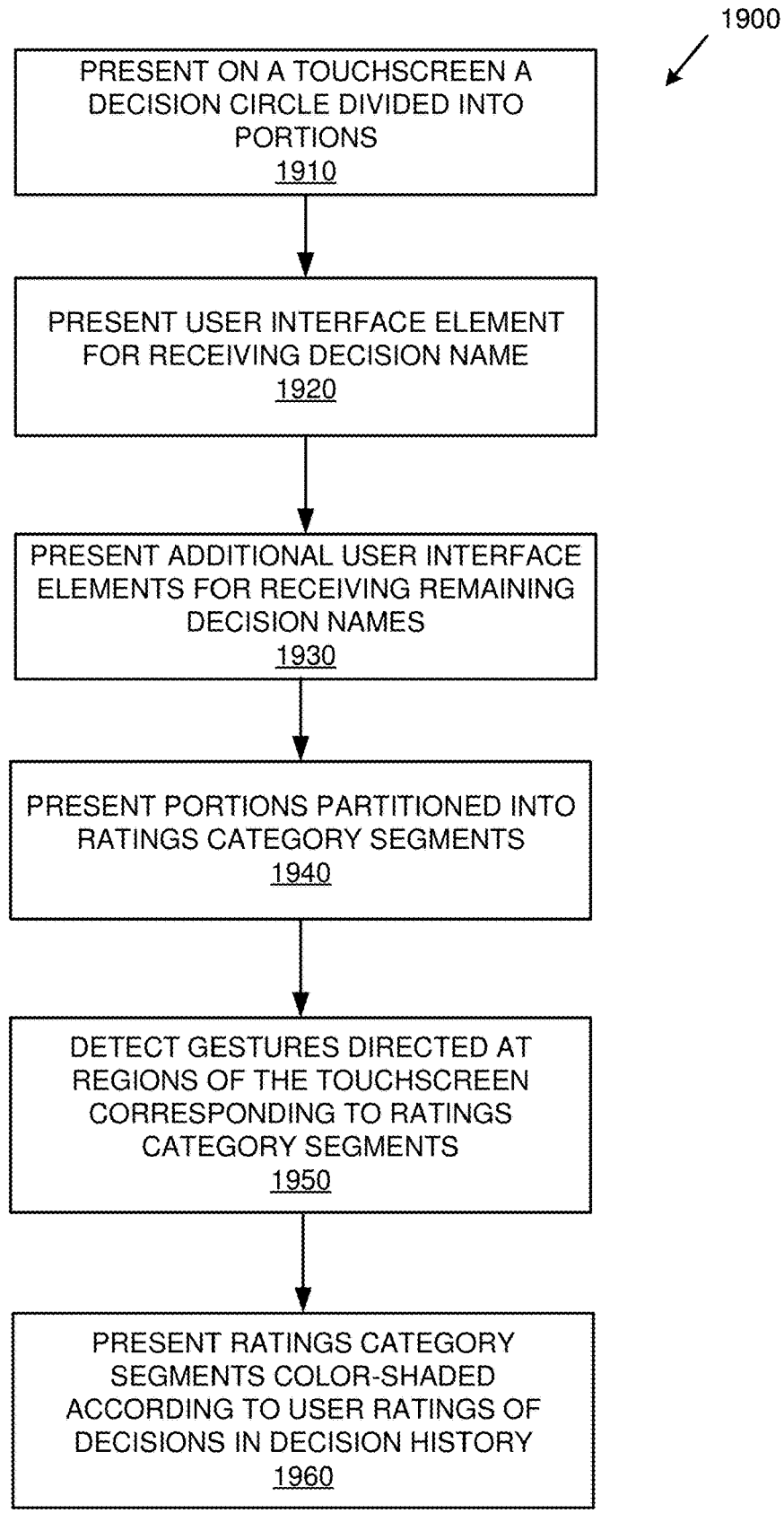
FIG. 19 is a flowchart of an exemplary method for presenting on a display a user interface for facilitating user reflection on past decisions.

Example 27—Exemplary Method of Presenting a User Interface with a Decision Circle FIG. 19 is a flowchart of an exemplary method 1900 for presenting on a touchscreen display a user interface for facilitating user reflection on past decisions to assist in making of future decisions. Such a method can be used in conjunction with the user interfaces shown in FIGS. 7-15, modified to include decision circles.

At 1910, a decision circle divided into portions is presented on the touchscreen. Each of the portions represents a different decision in a decision history of a user. At 1920, a user interface element for receiving a first decision name is presented. The presentation of the user interface element can be responsive to activation of a first portion of the decision circle by the user. At 1930, additional user interface elements are presented for receiving remaining decision names. The presentation of the additional user interface elements can be responsive to activation of each remaining portion. At 1940, portions partitioned into ratings category segments are presented. At 1950, gestures directed at regions of the touchscreen corresponding to the ratings category segments are detected. At 1960, ratings category segments color-shaded according to user ratings of the different decisions in decision history are presented. The color-shading can be responsive to touchscreen gestures directed at the rating categories segments.

Example 28—Exemplary Advantages

Examples described herein can have several advantages. For example, career history exercise results and visualizations can support and facilitate user reflection on his or her own past career decisions. As a result, that user may discover his or her own approach towards decision-making, such as by gaining insights and understanding of past decisions. The user can uncover patterns in his or her own career decisions and thus be better informed and prepared when approaching a future career decision.

Looking back on decisions in the past can assist a user in understanding what drove or motivated these past decisions. From this understanding, options for the future can be deduced. For example, approaches applied successfully in the past can be reapplied to future decisions to increase likelihood of future success.

Example 29—Exemplary Computing Systems

Figure 20:
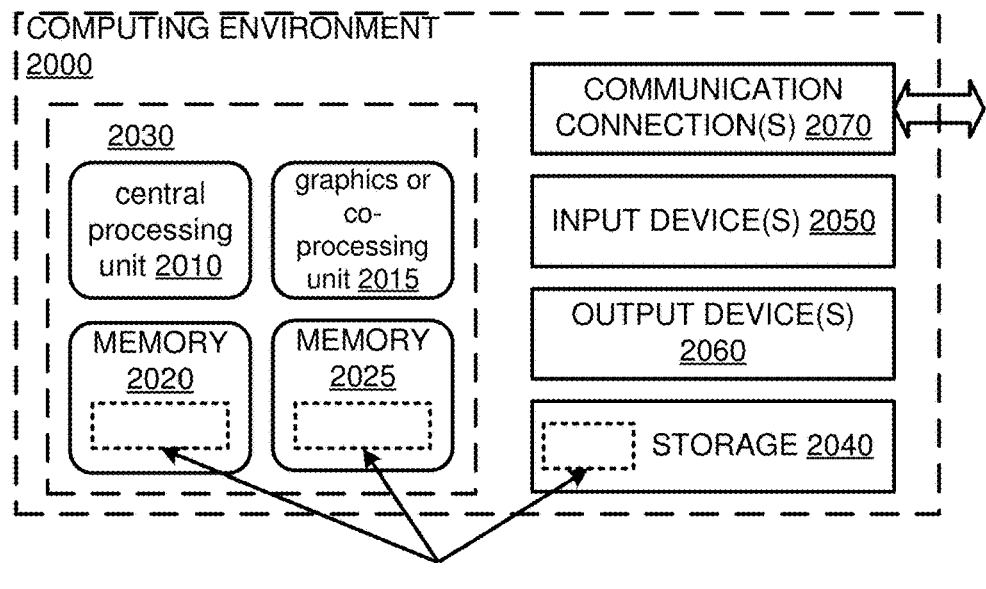
FIG. 20 is a diagram of an exemplary computing system in which some described embodiments can be implemented.

FIG. 20 depicts a generalized example of a suitable computing system 2000 in which the described innovations may be implemented. The computing system 2000 is not intended to suggest any limitation as to scope of use or functionality, as the innovations may be implemented in diverse general-purpose or special-purpose computing systems.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), nonvolatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing system 2000 includes storage 2040, one or more input devices 2050, one or more output devices 2060, and one or more communication connections 2070. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. For video encoding, the input device(s) 2050 may be a camera, video card, TV tuner card, or similar device that accepts video input in analog or digital form, or a CD-ROM or CD-RW that reads video samples into the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 30—Exemplary Mobile Device

Figure 21:
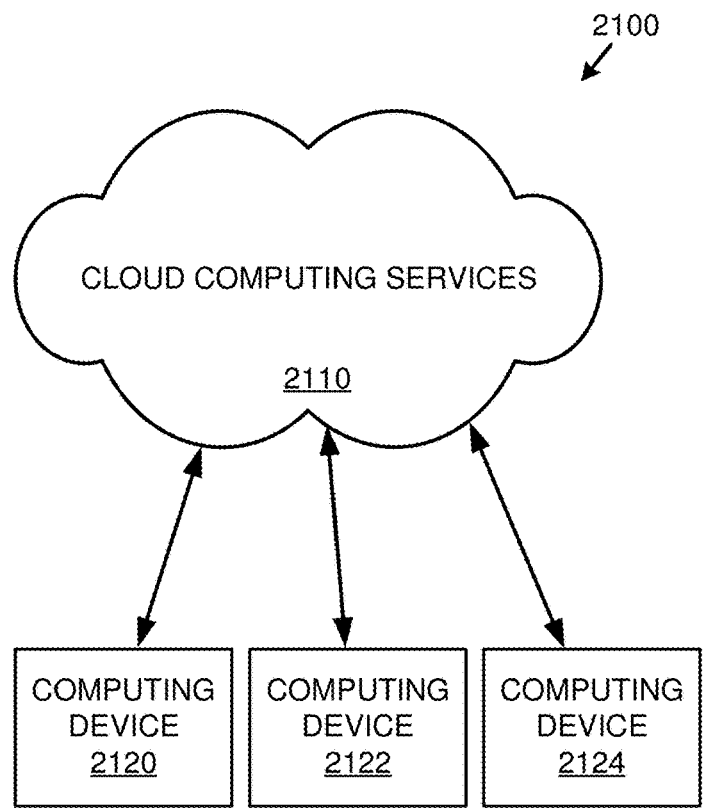
FIG. 21 is an exemplary mobile device that can be used in conjunction with the technologies described herein.

FIG. 21 is a system diagram depicting an exemplary mobile device 2100 including a variety of optional hardware and software components, shown generally at 2102. Any components 2102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 2104, such as a cellular, satellite, or other network.

The illustrated mobile device 2100 can include a controller or processor 2110 (e.g., signal processor, microprocessor, ASIC, or other control and processing logic circuitry) for performing such tasks as signal coding, data processing, input/output processing, power control, and/or other functions. An operating system 2112 can control the allocation and usage of the components 2102 and support for one or more application programs 2114. The application programs can include common mobile computing applications (e.g., email applications, calendars, contact managers, web browsers, messaging applications), or any other computing application. Functionality 2113 for accessing an application store can also be used for acquiring and updating applications 2114.

The illustrated mobile device 2100 can include memory 2120. Memory 2120 can include non-removable memory 2122 and/or removable memory 2124. The non-removable memory 2122 can include RAM, ROM, flash memory, a hard disk, or other well-known memory storage technologies. The removable memory 2124 can include flash memory or a Subscriber Identity Module (SIM) card, which is well known in GSM communication systems, or other well-known memory storage technologies, such as "smart cards." The memory 2120 can be used for storing data and/or code for running the operating system 2112 and the applications 2114. Example data can include web pages, text, images, sound files, video data, or other data sets to be sent to and/or received from one or more network servers or other devices via one or more wired or wireless networks. The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 2100 can support one or more input devices 2130, such as a touchscreen 2132, microphone 2134, camera 2136, physical keyboard 2138 and/or trackball 2140 and one or more output devices 2150, such as a speaker 2152 and a display 2154. Other possible output devices (not shown) can include piezoelectric or other haptic output devices. Some devices can serve more than one input/output function. For example, touchscreen 2132 and display 2154 can be combined in a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the mobile device and a public switched telephone network (PSTN).

The mobile device can further include at least one input/output port 2180, a power supply 2182, a satellite navigation system receiver 2184, such as a Global Positioning System (GPS) receiver, an accelerometer 2186, and/or a physical connector 2190, which can be a USB port, IEEE 1394 (FireWire) port, and/or RS-232 port. The illustrated components 2102 are not required or all-inclusive, as any components can deleted and other components can be added.

Example 31—Exemplary Cloud Computing Environment

Figure 22:
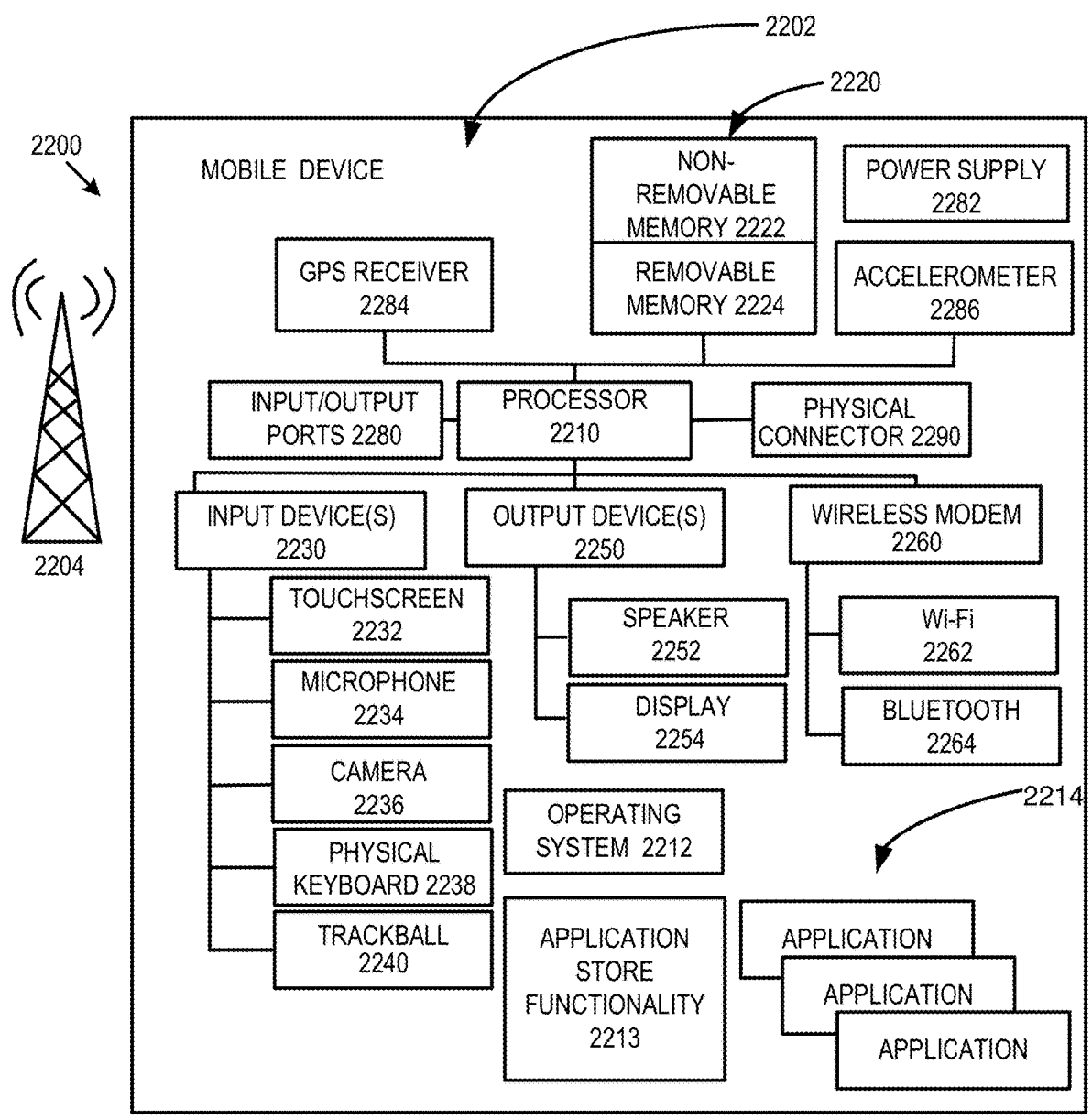
FIG. 22 is an exemplary cloud computing environment that can be used in conjunction with the technologies described herein.

FIG. 22 depicts an example cloud computing environment 2200 in which the described technologies can be implemented. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a data center of a business or organization) or distributed (e.g., provided by various computing resources located at different locations, such as different data centers and/or located in different cities or countries).

The cloud computing services 2210 are utilized by various types of computing devices (e.g., client computing devices), such as computing devices 2220, 2222, and 2224. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operators (e.g., data processing, data storage, and the like).

Example 32—Exemplary Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or non-volatile memory components (such as flash memory or hard drives)). By way of example and with reference to FIG. 20, computer-readable storage media include memory 2020 and 2025, and storage 2040. By way of example and with reference to FIG. 21, computer-readable storage media include memory and storage 2120, 2122, and 2124. As should be readily understood, the term computer-readable storage media does not include communication connections (e.g., 2070, 2160, 2162, and 2164) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved.

Alternatives and Variations

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope of these claims.

We claim:

1. A computing device, comprising:
at least one processor; and
at least one computer-readable storage media storing computer-executable instructions, that, when executed by the at least one processor, cause the computing device to perform a series of operations comprising:
presenting a milestone circle divided into a plurality of portions, the respective portions representing different stages in a career history of a user;
receiving input activating a first portion of the plurality of portions;
receiving input activating one of the remaining portions of the plurality of portions;
partitioning the first portion of the milestone circle into a first ratings category segment representing a first ratings category and a second ratings category segment representing a second ratings category, wherein the first and second ratings categories represent characteristics describing each stage of the career history;
partitioning the one of the remaining portions of the plurality of portions of the milestone circle into ratings category segments representing the first and second ratings categories, respectively, wherein the milestone circle has a center section, and wherein the first and second ratings category segments of the first portion of the milestone circle and the ratings category segments of the one of the remaining portions of the milestone circle begin at the center section of the milestone circle and extend outward;
receiving ratings from the user for the first and second ratings categories for the respective different career stages corresponding to the first portion and the one of the remaining portions of the milestone circle; and responsive to the received user's ratings, generating a visual effect comprising modifying the first and second ratings category segments of the first portion, and the first and second ratings category segments of the one of the remaining portions, wherein the visual effect reflects the ratings received from the user.

2. The computing device of claim 1, wherein the respective ratings category segments of the first portion and the respective ratings category segments of the one of the remaining portions are represented as ratings units that correspond to the received ratings.

3. The computing device of claim 2, wherein the plurality of portions of the milestone circle are substantially a same size and the ratings units are concentric, arc-shaped units.

4. The computing device of claim 1, wherein the milestone circle enables freeform navigation during administration of a career history exercise.

5. The computing device of claim 1, further comprising a touchscreen display, and wherein the milestone circle is presented on the touchscreen display and the input activating the first portion is received via the touchscreen display.

6. The computing device of claim 1, further comprising a touchscreen display, and wherein the receiving of the input activating the first portion comprises detecting a touch input on a region of the touchscreen display corresponding to the first portion.

7. The computing device of claim 1, wherein the receiving the ratings comprises detecting a touchscreen gesture directed at a ratings category segment of one of the plurality of portions of the milestone circle.

8. The computing device of claim 1, wherein the operations further comprise receiving a first career stage name corresponding to the first portion, and wherein the receiving of the first career stage name comprises accessing stored career history data and retrieving the first career stage name from the stored career history data.

9. The computing device of claim 1, wherein the operations further comprise receiving a first career stage name corresponding to the first portion, and wherein the receiving of the first career stage name comprises receiving the first career stage name via a user interface element.

10. The computing device of claim 1, wherein the modifying comprises color-shading the first and second ratings category segments of the first portion and the ratings category segments of the one of the remaining portions according to the received ratings, wherein the color-shading is according to ratings category.

11. The computing device of claim 10, wherein the visual effect is a first visual effect, and the operations further comprise:
receiving a selection of the first ratings category; and
responsive to the selection, generating a second visual effect different from the first visual effect, the second visual effect comprising maintaining color-shading in ratings category segments that correspond to the first ratings category and removing color-shading in ratings category segments that correspond to the second ratings category.

12. The computing device of claim 1, wherein the operations further comprise:
transmitting the milestone circle with the modified ratings category segments to a webpage associated with the user for display.

13. The computing device of claim 1, wherein the operations further comprise:
in response to a gesture directed at one of the ratings category segments, displaying a description of the one of the ratings category segments.

14. The computing device of claim 1, wherein the operations further comprise:
responsive to an interaction with a region of a touchscreen corresponding to one of the ratings category segments, displaying a window with text describing ratings for the interacted with ratings category segment.

15. A method, implemented at least in part by one or more computing devices having at least one processor, for presenting a user interface for visualizing a career history exercise, the method comprising:
generating, for display, a milestone circle divided into a plurality of portions, the respective portions representing different stages in a career history of a user;
receiving input activating a first portion of the plurality of portions;
receiving a first career stage name for the first portion;
following activation of the remaining portions of the plurality of portions, receiving respective career stage names for the remaining portions;
partitioning the first portion of the milestone circle into a first ratings category segment representing a first ratings category and a second ratings category segment representing a second ratings category, wherein the first and second ratings categories represent characteristics describing respective stages of the career history;
partitioning the respective remaining portions of the plurality of portions of the milestone circle into ratings category segments representing the first and second ratings categories, respectively, wherein the milestone circle has a center portion, and wherein the first and second ratings category segments of the first portion of the milestone circle and the ratings category segments of the respective remaining portions of the milestone circle begin at the center portion of the milestone circle and extend away from the center portion;
receiving ratings from the user for the first and second ratings categories for the respective different career stages corresponding to the respective portions of the milestone circle; and
responsive to the received ratings, generating a visual effect comprising modifying the first and second ratings category segments of the first portion, and the first and second ratings category segments of the remaining portions, to reflect the received ratings.

16. The method of claim 15, wherein the modifying comprises color-shading the first and second ratings category segments of the first portion and the ratings category segments of the remaining portions according to the received ratings, wherein the color-shading is according to ratings category.

17. The method of claim 15, wherein the modifying comprises resizing at least some of the first and second ratings category segments of the first portion and the ratings category segments of the remaining portions according to the received ratings, wherein for a particular ratings category segment, the larger the size, the higher the corresponding rating, and the farther the particular ratings category segment extends away from the center of the milestone circle.

18. One or more non-transitory computer-readable storage media storing computer-executable instructions for causing a computing device to perform a method for presenting a user interface for visualizing a career history exercise, the method comprising:

displaying a milestone circle divided into at least three portions, the respective portions corresponding to different stages in a career history of a user;

activating a first, second, and third portion of the at least three portions based on received input;

partitioning the first, second, and third portions, respectively, of the milestone circle into a first ratings category segment representing a first ratings category, a second ratings category segment representing a second ratings category, and a third ratings category segment representing a third ratings category, wherein the first, second, and third ratings categories represent characteristics describing the respective stages of the career history, wherein the milestone circle has a central portion, and wherein the first, second, and third ratings category segments of the first, second, and third portions of the milestone circle begin at the center portion of the milestone circle and extend away from the center portion;

receiving ratings from the user for the first, second, and third ratings categories for the respective different career stages represented by the first, second, and third portions;

responsive to the received user's ratings, generating a first visual effect comprising color-shading, by ratings category, the first, second, and third ratings category segments of the first, second, and third portions according to the ratings received from the user;

displaying a user interface element for selective viewing that is associated with the first ratings category, wherein activation of the user interface element for selective viewing causes a second visual effect involving color-shaded ratings units corresponding to both the second and third ratings categories in each of the first, second, and third portions of the milestone circle; and responsive to activation of the user interface element for selective viewing, generating the second visual effect, wherein the second visual effect comprises maintaining, in the first, second, and third portions of the milestone circle, the color-shading of ratings category segments corresponding to the first ratings category and removing, from the first, second, and third portions of the milestone circle, the color-shading of ratings category segments that do not correspond to the first ratings category, wherein the first, second, and third ratings category segments are represented using a number of concentric, arc-shaped rating units that corresponds to the received ratings, wherein the higher the rating, the greater the number of rating units, and wherein an inner-most rating unit is adjacent to the center portion of the milestone circle.

19. The one or more non-transitory computer-readable storage media of claim 18, wherein the user interface element is a first user interface element, and the method further comprises:

activating a second user interface element;

in response to activation of the second user interface element, presenting a new portion in addition to the portions of the milestone circle;

activating a third user interface element; and in response to activation of the third user interface element, removing at least one portion from presentation in the milestone circle.

* * * * *